(12) United States Patent
Hall

(10) Patent No.: US 7,112,639 B2
(45) Date of Patent: Sep. 26, 2006

(54) POLYMERS

(75) Inventor: Alan William Hall, Cottingham, North Humberside (GB)

(73) Assignee: Qinetiq Limited, Hants (GB)

( * ) Notice: Subject to any disclaimer, the term of this patent is extended or adjusted under 35 U.S.C. 154(b) by 272 days.

(21) Appl. No.: 10/240,316

(22) PCT Filed: Mar. 30, 2001

(86) PCT No.: PCT/GB01/01424

§ 371 (c)(1),
(2), (4) Date: Jan. 31, 2003

(87) PCT Pub. No.: WO01/74919

PCT Pub. Date: Oct. 11, 2001

(65) Prior Publication Data

US 2003/0225231 A1  Dec. 4, 2003

(30) Foreign Application Priority Data

Apr. 1, 2000 (GB) .................................. 0007967.3
Jan. 9, 2001 (GB) .................................. 0100481.1

(51) Int. Cl.
*C08F 120/42* (2006.01)

(52) U.S. Cl. .................................................. 526/218.1

(58) Field of Classification Search .............. 526/218.1
See application file for complete search history.

(56) References Cited

U.S. PATENT DOCUMENTS

| 3,891,576 A | 6/1975 | Battaerd |
| 3,941,724 A | 3/1976 | Bolto |
| 5,837,789 A | 11/1998 | Stockhausen et al. |

FOREIGN PATENT DOCUMENTS

| EP | 0000426 | 1/1979 |
| EP | 0 282 081 A1 * | 3/1987 |
| EP | 0 282 081 | 9/1988 |
| EP | 0 487 975 A1 | 6/1992 |
| EP | 0 688 800 A1 * | 12/1995 |
| GB | 1407116 | 9/1975 |
| JP | 3079610 | 4/1991 |
| JP | 4-108452 | 4/1992 |
| WO | 0006533 | 2/2000 |
| WO | 0006658 | 2/2000 |

* cited by examiner

*Primary Examiner*—Robert D. Harlan
(74) *Attorney, Agent, or Firm*—Nixon & Vanderhye P.C.

(57) ABSTRACT

A copolymer containing repeat units formed from the monomers (I) and (II), wherein each $R^1$, if present, is independently hydrogen or hydrocarbyl; r is 0, 1 or 2; s is either 2 or 3; $R^2$–$R^4$ are each independently hydrogen or hydrocarbyl; $R^5$ and $R^6$ are each independently hydrogen, halo or hydrocarbyl; $P_d^-$ is the anion formed by loss of a proton from a proton donating group $P_d$—H; Z is either a bond or hydrocarbyl; $R^7$ and $R^8$ are each independently hydrogen, halo or hydrocarbyl; and either (a) A is an electron accepting group and W is either hydrogen or hydrocarbyl, (b) W is an electron accepting group and A is either a bond or hydrocarbyl or (c) both A and W are electron accepting groups. The invention also provides a method for preparing the copolymer by polymerising a mixture of (I) and (II) or their non-ionised precursors, preferably by exposure to ultraviolet radiation. The invention also relates to the uses of the copolymer in adhesive, coating, sealant and stereolithographic compositions $$(R^1)_{(3-S)}-\overset{+}{\underset{H}{N}}\!\!\!+\!(CR^2R^3)_r-CR^4\!=\!CR^5R^6]_s \quad \text{(I)}$$

Figure 1:
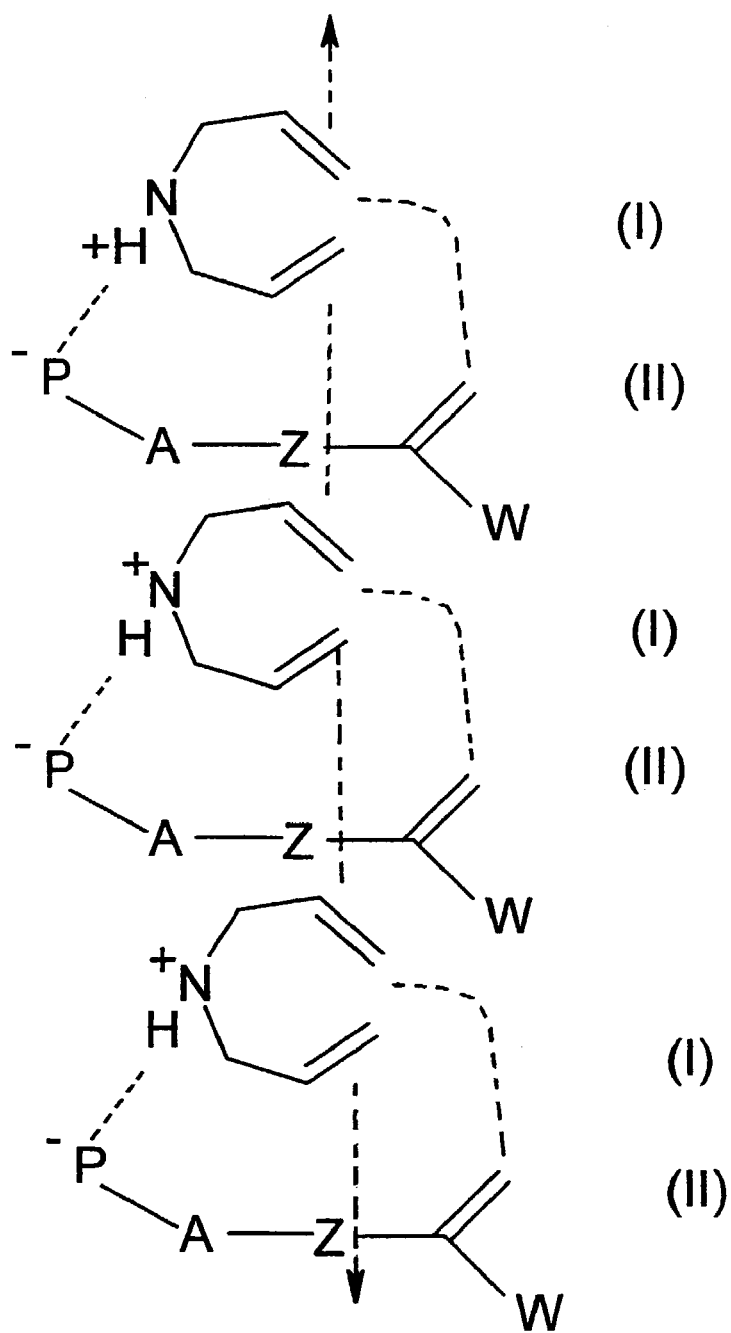

$$^-P_d-A-Z-C\!\!\begin{array}{c}CR^7R^8\\ \diagdown \\ W\end{array} \quad \text{(II)}$$

28 Claims, 1 Drawing Sheet

POLYMERS

This invention relates to novel copolymers, their preparation and their uses, as well as to precursor monomer mixtures.

Polymers made from allylamine monomers, in particular diallylamines, are already known; examples are described for instance in WO-00/06533, WO-00/06610 and WO-00/006658. The monomers can be "activated" by the inclusion of appropriately positioned electron withdrawing groups, making them more readily polymerisable for instance by ultraviolet curing. The resulting high strength cross-linked polymers are of use, inter alia, as coatings, adhesives and sealants.

An example diallyamine monomer has the general formula:

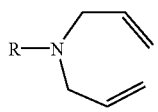

and when polymerised containes a heterocylic group of the general formula:

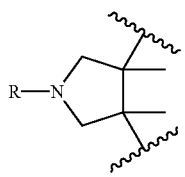

Embodiments of the present invention provide copolymers which include allylamine monomers.

According to a first aspect of the present invention there is provided a copolymer containing repeat units from both the monomer (I):

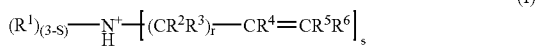

(I)

and the monomer (II):

(II)

In the ammonium monomer (I), each $R^1$, if present, is inpendently either hydrogen or a hydrocarbyl group, r is 0, 1 or 2 and s is iether 2 or 3. $R^2$–$R^4$ are each independently a hydrocarbyl group or, preferably, hydrogen. $R^5$ and $R^6$ are each independently either hydrocarbyl, halo such as fluoro or, preferably, hydrogen.

In the monomer (II), $P_d^-$ is the anion formed by loss of a proton from a proton donating group $P_d$—H, Z is either a bond or a hydrocarbyl group, and $R^7$ and $R^8$ are each independently hydrogen, a halo group such as fluoro or a hydrocarbyl group, preferably hydrogen. A may be an electron accepting group, in which case W is either hydrogen or a hydrocarbyl group. Alternatively, W is an electron accepting group and A represents either a bond or a hydrocarbyl group. In a yet further alternative, both A and W may be electron accepting groups.

The copolymer may be prepared, according to a second aspect of the invention, by polymerising a mixture of the monomers (I) and (II), which in turn may be prepared by mixing together the precursor allylamine (III):

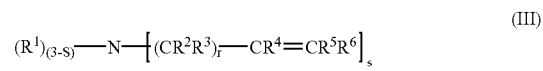

(III)

and the proton donor (IV):

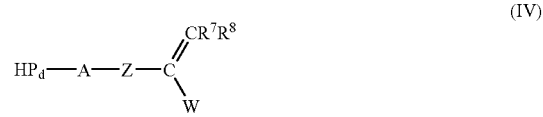

(IV)

Alternatively, the polymerisable monomer mixture may be prepared by mixing together the already ionised monomers (I) and (II), each stabilised by a suitable counterion such as (in the case of monomer (I)) halide or $PF_6^-$ or (in the case of monomer (II)) an alkali metal cation such as $Na^+$.

Thus, a third aspect of the present invention provides a polymerisable mixture of the monomers (I) and (II), and/or of their precursors (III) and (IV). The mixture preferably polymerises (either spontaneously or with the aid of a suitable initiator) on exposure to radiation, preferably thermal, ultraviolet, visible or electron beam radiation or a radioactive source, most preferably visible and/or ultraviolet radiation.

The first aspect of the invention naturally encompasses any copolymer formed on, or obtainable by, polymerisation of such a mixture.

A fourth aspect provides the use of a mixture according to the third aspect, in preparing a copolymer according to the first aspect, in the copolymer preparation method of the second aspect, in the preparation of a coating, adhesive or sealant composition and/or in a method for applying a coating, adhesive or sealant to a substrate.

A fifth aspect provides the use of the monomer (II) or its precursor (IV) in the preparation of a copolymer with the monomer/precursor (I)/(III), and/or in the preparation of a coating, adhesive or sealant composition containing (I)/(III), and/or in a method for applying a coating, adhesive or sealant to a substrate which method also involves the use of the monomer/precursor (I)/(III).

A sixth aspect provides the use of the monomer (I) or its precursor (III) in the preparation of a copolymer with the monomer/precursor (II)/(IV), and/or in the preparation of a coating, adhesive or sealant composition containing (II)/(IV), and/or in a method for applying a coating, adhesive or sealant to a substrate which method also involves the use of the monomer/precursor (II)/(IV).

Wherever the methods provided by the present invention involve polymerisation of a monomer/precursor mixture, the polymerisation is preferably effected by non-chemical means such as by radiation (including thermal) curing, more preferably using ultraviolet, visible or electron beam radiation, most preferably using ultraviolet and/or visible radiation. A suitable polymerisation initiator may also be used.

The copolymers of the first aspect of the invention are cross-linked network polymers which can have high strength and low water permeability and may therefore be of particular use as coatings, adhesives and/or sealants. Thus, a seventh aspect of the invention provides a coating, adhesive or sealant composition containing a copolymer according to the first aspect or a monomer/precursor mixture according to the third. An eighth aspect provides a kit for preparing an adhesive, coating or sealant composition, in particular an adhesive composition, the kit comprising a quantity of the monomer (I) and/or its precursor (III), a quantity of the monomer (II) and/or its precursor (IV) and optionally a polymerisation initiator, preferably a photoinitiator capable of promoting ultraviolet curing of a mixture of (I)/(III) and (II)/(IV).

According to a ninth aspect of the present invention, there is provided a method for preparing a coating, adhesive or sealant composition, comprising mixing together the monomers (I) and (II) and/or their precursors (III) and (IV) and optionally polymerising the mixture.

A tenth aspect provides a method for applying a coating, adhesive or sealant to a substrate, the method comprising applying to the substrate a monomer/precursor mixture according to the third aspect of the invention, optionally with a polymerisation initiator, and inducing polymerisation of the mixture on the substrate. This in situ polymerisation is ideally radiation induced, again preferably by ultraviolet and/or visible radiation.

An eleventh aspect of the invention provides a product having deposited thereon a coating, adhesive or sealant comprising a copolymer according to the first aspect of the invention, a monomer/precursor mixture according to the third aspect or a composition according to the seventh aspect.

The copolymers of the invention, and compositions containing them, may also be of use in stereolithography, for instance as described in co-pending UK patent application no. 9928621.3. Twelfth to fourteenth aspects of the invention therefore provide, respectively, the use of a copolymer according to the first aspect, and/or of a monomer/precursor mixture according to the third, in stereolithography; a stereolithographic composition containing such a copolymer and/or mixture; and a stereolithographic process which involves the use of the copolymer and/or mixture, or of a composition according to the thirteenth aspect of the invention, to produce an object, in particular a three dimensional object. A fifteenth aspect provides a product obtained by the process of the fourteenth.

In a copolymer according to the invention, the anions of monomer (II) associate with the cations of monomer (I), as shown schematically in FIG. 1. An additional association is thought to exist between the carbon-carbon double bond of monomer (II) and the allyl double bonds of monomer (I). This can "protect" the nitrogen atom in (I) from solvation, thus rendering the copolymer relatively stable and water impermeable, as compared for instance to a homopolymer formed from the corresponding allylamine (III) alone. The copolymers of the invention also appear to be stronger and harder than corresponding homopolymers, again indicating the intimate involvement of the monomer (II) with the protonated allylamine (I).

It is thus possible, although we do not wish to be bound by this theory, that the heterocyclic groups which are usually formed on polymerisation of an allylamine are not present in the copolymers of the present invention.

The monomer precursor (III) is activated, for polymerisation, by the precursor (IV) which donates a proton to form the ammonium salt (I). This form of activation is not per se unknown, but prior art techniques have generally used mineral acids such as HCl, HBr and HI, or $PF_6^-$ anions, to activate an allylamine monomer prior to polymerisation. The present invention differs in that it recognises the advantage of providing an additional carbon-carbon double bond on the counterion, so as to form a copolymer in which the double bonds of both the allylamine and the counterion can associate intimately with one another.

The important functionality in the monomer (II)/(IV) is thus the presence, in reasonably close proximity (for instance with no more than four, preferably no more than three, more preferably two or most preferably one chain atom between them) of both a proton donating group and a carbon-carbon double bond. The monomer (II)/(IV) should also preferably include at least one electron accepting group to help stabilise the deprotonated anion and activate the carbon-carbon double bond; again, the electron accepting group is preferably in reasonably close proximity (for instance with no more than four, preferably no more than three, more preferably two or most preferably one or no chain atoms between them) to the double bond. Such chain atoms are typically carbon atoms.

The relative proximity of these functional groups may depend on stereochemical constraints in the final copolymer.

In the monomer (II) and its precursor (IV), the proton donating group $P_d$—H is preferably OH, but may alternatively be a group such as SH or $NH_2$.

The electron accepting group A and/or W preferably is, or contains, a group such as C=O, C=S, S=O, O=S=O or P=O. More preferably it either is or contains C=O, P=O or O=S=O.

Preferably A is the electron accepting group, which is then adjacent the proton donating group $P_d$—H. A particularly suitable group $-P_d$-A- is a carboxylate anion, $^-$OOC—.

Alternatively, the group -A-$P_d$—H may be a sulphonic acid, of the formula:

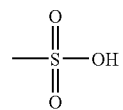

or a phosphonic acid, of the formula:

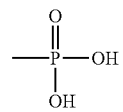

The inclusion of a vinyl sulphonate as the monomer (II) can yield more flexible copolymers, increasing the diversity of applications for the present invention. The inclusion of vinyl phosphonate groups can allow the creation of biocompatible copolymers. The phosphonic acid group also contains two potentially transferable protons; one or both of them may be associated with the ammonium monomer (I) depending on the conditions and on the relative amounts of the two monomers present.

Z is preferably a group $(CH_2)_n$ where n is either 0 (ie, Z is a bond), 1, 2 or 3, more preferably either 0 or 1, most preferably 0.

If A is an electron accepting group, W is preferably either hydrogen, lower alkyl (for instance, methyl, ethyl or propyl), lower alkenyl or a substituted lower alkyl group such as $CF_3$. More preferably W is either hydrogen, methyl, $CF_3$ or $(CH_2)_p CO_2 H$ with p being an integer from 1 to 5, preferably 1. Thus, W may contain an additional acid or carboxylate group.

It may be preferred, in the monomer (II) and its precursor (IV), for $R^7$ and $R^8$ both to be hydrogen.

It is also preferred that -A-$P_d$—H is not —C(O)—NHR (R being hydrogen or hydrocarbyl), ie, that the combination of the proton donating group and the group A is not an amide (such as when the monomer precursor (IV) is acrylamide); this group is unlikely to function as a proton donor.

Particularly preferred forms of (II) are acrylates such as (V):

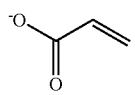

(V)

methacrylates such as (Va):

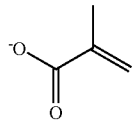

(Va)

or methacrylate analogues (substituted acrylates) such as (Vb):

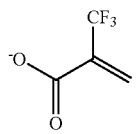

(Vb)

itaconates such as (VI):

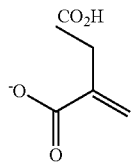

(VI)

vinyl sulphonates such as (VII):

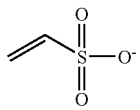

(VII)

or vinyl phosphonates such as (VIIa):

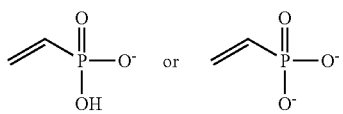

(VIIa)

The itaconate anion contains two potentially activated proton donating groups, and is thought to be able to form stronger bonds with the allylamine monomer (I). The second acid group of the itaconate may also be deprotonated when mixed with a monomer (I), depending on the relative amounts of the two monomers present.

Itaconates can be prepared for instance from itaconic anhydride and a suitable ring-opening reagent, in particular an alcohol (for example 1,10-decanediol or 2,2,3,3,4,4,5,5,6,6,7,7-dodecafluoro-1,8-octanediol) carrying the group corresponding to W in formula (II).

In some cases, in particular where $R^2$–$R^6$ are all H and r is 1 in the monomer (I), more particularly where the monomer (I) is protonated diallylamine (ie, $R^1$ is also H and s is 2) or triallylamine (s is 3), it may be appropriate to exclude one or more of acrylate, 3-hydroxypropyl acrylate, methacrylate, itaconate, fumarate, citraconate and maleate anions from use as the monomer (II) in the present invention. This may also apply when the monomer (I) is protonated dimethallylamine, whether the α ($R^2$ is methyl) and/or the β ($R^4$ is methyl) and/or the γ ($R^5$ is methyl) form, with r being 1, s being 2 and the remainder of $R^1$–$R^6$ being hydrogen. It may also apply when r is 1, s is 2, $R^2$–$R^6$ are all hydrogen and $R^1$ is either methyl, ethyl or butyl.

In such cases it may be appropriate to exclude one or more of vinyl acetate, 2-acrylamido-2-methyl propane sulphonate, vinyl sulphonate and (methyl)allyl sulphonate from use as the monomer (II).

In particular if (I) is protonated diallylamine, diacrylates may be excluded from use as the monomer (II).

In certain cases, particularly if -Z-A-$P_d^-$ is —$CO_2^-$, it may be appropriate for W not to be and/or include another group —$CO_2^-$ or —$CO_2H$. Instead or in addition, if -Z-A-$P_d^-$ is —$CO_2^-$ and W is H, it may be appropriate for neither of $R^7$ and $R^8$ to be and/or include a group —$CO_2^-$ or —$CO_2H$.

It may be appropriate, especially if (I) is protonated diallylamine, for (II) not to contain two carboxyl(ate) groups —$CO_2^-$ or —$CO_2H$.

If W is an electron accepting group, A may be for instance $(CH_2)_q$, where q is 0, 1, 2 or 3, preferably 1. Z is then preferably a bond. Suitable electron accepting groups W include C(O)—$(CH_2)_t CH_3$, where t is 0 or an integer from 1 to 5, preferably 0.

A group W or A may itself be or contain further activated proton donating groups of the general formula (VIII):

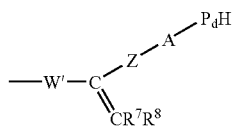

(VIII)

(or their deprotonated anionic analogues) where $P_d$, A, Z, $R^7$ and $R^8$ are as defined in relation to formula (II) and W' is either a bond or a hydrocarbyl group and/or an electron accepting group, and may in particular be a bridging group of valency v capable of carrying v groups —C(ZAP$_d$H)=CR$^7$R$^8$ or —C(ZAP$_d^-$)=CR$^7$R$^8$, where v is an integer from 2 to 8, preferably either 2, 3 or 4, more preferably 2.

In other words, the monomer (II)/(IV) may contain more than one, preferably two, functional groups of the formula HP$_d$AZ-C=CR$^7$R$^8$, ie, it may have the general formula (IX):

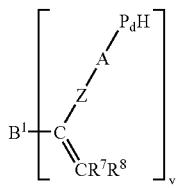

(IX)

in which $B^1$ is a bridging group of valency v and v is as in formula (VIII), and in which the groups —P$_d$H may be wholly or partially present as the deprotonated analogues —P$_d^-$. Such multi-functional monomers are capable of associating with the monomer (I) at more than one site in the copolymer, resulting in a potentially stronger product.

Examples of suitable bridging groups $B^1$ include H$_2$C—C(O)—O—(CH$_2$)$_w$—O—C(O)—CH$_2$, where w is an integer from 1 to 20, for instance 10; and H$_2$C—C(O)—O—CH$_2$—(CF$_2$)$_y$—CH$_2$—O—C(O)—CH$_2$, where y is an integer from 1 to 20, preferably from 1 to 10, for instance 6. Other suitable bridging groups are those mentioned below in connection with the monomer (I) (as the group $B^2$). The length and nature of the bridging group $B^1$ can be used to influence the copolymer properties.

In the monomer (I) and its precursor (III), r is preferably 1 or 2, more preferably 1. $R^2$ and $R^3$ are each preferably either hydrogen or a lower alkyl or alkenyl group; more preferably at least one of $R^2$ and $R^3$ is hydrogen, most preferably both.

$R^4$ is preferably either hydrogen or a lower alkyl or alkenyl group, more preferably hydrogen.

$R^5$ and $R^6$ are each preferably either hydrogen or fluoro. Preferably at least one, more preferably both, are hydrogen.

$R^1$ may be either hydrogen or a hydrocarbyl (for instance alkyl, alkenyl, alkynyl, aryl, aralkyl or alkaryl) group, more preferably either hydrogen or a lower alkyl or alkenyl such as prop-2-enyl. It may be a substituted alkyl or alkenyl, in particular a hydroxyalkyl, such as hydroxyethyl or a group C((CH$_2$)$_h$OH)$_j$(H)$_k$, where j is an integer from 1 to 3, k is (3-j) and h is an integer from 1 to 20, preferably from 1 to 10, more preferably from 2 to 6.

In particular, $R^1$ may be substituted with one or more functional groups and/or contain one or more double or triple bonds (whether carbon-carbon, carbon-heteroatom or heteroatom-heteroatom, and either aromatic, partially aromatic or non-aromatic).

$R^1$ is preferably not such as to make the monomer (I)/(III) an amide or sulphonamide. In particular, it may be preferred that the monomer (I)/(III) is neither diallyl acrylamide nor diallyl succinate.

The monomer (I) is preferably a diallylamine, ie, s=2, in which case $R^1$ is preferably hydrogen. It may however be a triallylamine, ie, s=3. In both cases, $R^2$–$R^6$ are preferably all hydrogen and r is preferably 1.

In other cases, it may be preferred that $R^2$–$R^6$ are all hydrogen, r is preferably 1 and $R^1$, where present, is not hydrogen.

However, in some cases the monomer (I) may be other than protonated triallylamine and/or diallylamine and/or methyldiallylamine and/or dimethallylamine and/or diallyl-methylamine, diallylethylamine or diallylbutylamine. This may be particularly suitable when the monomer (II) is acrylate, a diacrylate, 3-hydroxypropyl acrylate, methacrylate, vinyl acetate, itaconate, maleate, fumarate, citraconate, 2-acrylamido-2-methyl propane sulphonate, vinyl sulphonate or (methyl)allyl sulphonate.

The monomer (I) may be a mono-diallylamine. Alternatively, and often preferred, it may be a multi-diallylamine of the formula (X) in which $R^1$ functions as a bridging group $B^2$:

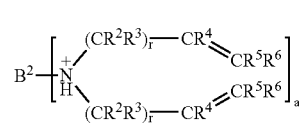

(X)

In formula (X), $B^2$ is a bridging group of valency a, and a is an integer of 2 or more, preferably from 2 to 8, more preferably either 2, 3 or 4, most preferably 2 (ie, the monomer (X) is a bis-diallylamine). Examples of suitable bridging groups $B^2$ include —(CH$_2$)$_b$— where b is an integer from 1 to 20, preferably between 2 and 12, for instance 10. Again, $B^2$ is preferably not such as to make the monomer (I) an amide or sulphonamide rather than an amine, as this may inhibit its protonation.

Other suitable bridging groups $B^2$ are known for example from polymer, paint or coating chemistry. They may include straight or branched chain alkyl groups, optionally substituted or interposed with functional groups or siloxane groups such as alkyl siloxanes.

Suitable bridging groups include those found in polyethylenes, polypropylenes, nylons and other commonly used polymers, as listed in Table 1 below.

TABLE 1

| Polymer type | Repeat Unit of Bridging Group |
|---|---|
| Polyethylene | $CH_2$ |
| Polypropylene | $CH(CH_3)CH_2$ |
| Polystyrene | $CH_2CH(C_6H_5)$ where the phenyl ring is optionally substituted |
| Polyisobutylene | $CH_2CH(CH(CH_3)_2)$ |
| Polyisoprene | $CH_2CH(CH_3)$ |
| Polytetrafluoroethylene | $CH_2(CF_2)_xCH_2$ |
| Polyvinylidenefluoride | $CH_2(CF_2CH_2)_x$ |
| Polyethyleneoxide | $(OCH_2CH(CH_3))_xO$ |

TABLE 1-continued

| Polymer type | Repeat Unit of Bridging Group |
|---|---|
| Nylon | $CH_2(NHCOCH_2)_xCH_2$ |
| Peptide | $CH_2(NHCOCH_R)_xCH_2$ |
| Polyurethanes | —NH—CO—O— |
| Polyesters | —RC(O)OR'— where R and R' are organic groups such as hydrocarbyl |
| Polysiloxanes | e.g. —SiO$_2$—, —R$_2$SiO— or —R$_2$Si$_2$O$_3$— where R is an organic group such as hydrocarbyl |
| Polyacrylates | —CH$_2$C(COOH)H— |
| Polyureas | —NHCONH— |
| Polythioureas | —NH—C(S)—NH— |

The nature (especially the length) of the bridging group in monomer (I) will affect the properties of the copolymer derived from it. This can be used to design polymers with specific desired properties. For instance when the bridging group comprises relatively long chains (for example with in excess of 6 repeat units, such as from 6 to 20 repeat units), the polymer is likely to have more pliable plastic properties. Alternatively, when the bridging group is relatively short (eg, fewer than 6 repeat units), the material will be more brittle.

Preferred bridging groups for both the monomers (I) and (II) contain between 1 and 20, more preferably between 1 and 16 or 1 and 10, carbon atoms.

Other possible bridging groups $B^2$, for which a is 2, are groups of formula (XI):

where $Z^1$, $Z^2$ and $Z^3$ are independently selected from a bond or an optionally substituted linear or branched alkyl or alkene chain wherein optionally one or more non-adjacent carbon atoms is replaced with a heteroatom or an amide group; $Q^1$ and $Q^2$ are independently selected from an optionally substituted carbocyclic or heterocyclic ring which optionally contains bridging alkyl groups; and c and d are independently selected from 0, 1 or 2.

Suitable carbocyclic rings for $Q^1$ and $Q^2$ include cycloalkyl groups for example of from 1 to 20 carbon atoms. Bridged carbocyclic ring structures include 1,4-bicyclo[2.2.2]octane, decalin, bicyclo[2.2.1]heptane, cubane, diadamantane, adamantane. Suitable heterocyclic rings include any of the above where one or more non adjacent carbon atoms are replaced by a heteroatom such as oxygen, sulphur or nitrogen (including amino or substituted amino), or a carboxyl or an amide group.

Suitable optional substituents for the groups $Q^1$ and $Q^2$ include one or more groups selected from alkyl, alkenyl, alkynyl, aryl, aralkyl such as benzyl, or functional groups as defined below. Particular substituents for the groups $Q^1$ and $Q^2$ are oxo and halogen in particular fluorine and chlorine.

Suitable optional substituents for the alkyl and alkenyl groups $Z^1$, $Z^2$ and $Z^3$ include aryl, aralkyl and functional groups as defined below. Particular substituents include halogens such as fluorine and chlorine, and oxo.

Other sorts of bridging groups $B^2$ include electrically conducting chains, for instance, electrically conducting unsaturated chains such as alkenes or chains incorporating aromatic or heterocyclic rings. For example, $B^2$ may comprise a di-substituted conducting unit such as a tertathiafulvalene. Thus an example of a compound of formula (X) is a compound of formula (XII):

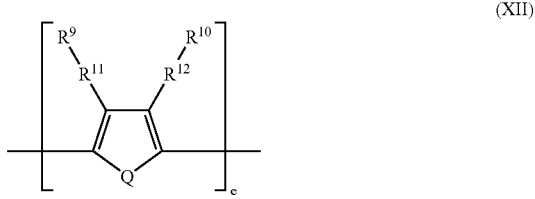

where $R^9$ and $R^{10}$ are each groups of formula (XIII):

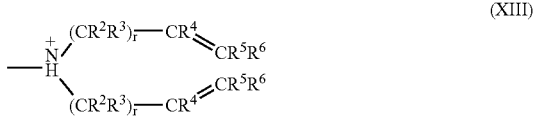

in which r, $R^2$, $R^3$, $R^4$, $R^5$ and $R^6$ are as defined in relation to formula (I); $R^{11}$ and $R^{12}$ are independently selected from groups of formula (XI) as given above; e is an integer of 1 or more, for example from 1 to 6; and Q is sulphur, oxygen or NH. In particular $R^{11}$ and $R^{12}$ may be alkyl groups.

Copolymerisation of a compound of formula (XII) with a monomer of formula (II) can yield a very stable material with robust physical properties. Varying the length of the spacer groups $R^{11}$ and $R^{12}$ can be used to control the properties of the copolymer. For instance when $R^{11}$ and $R^{12}$ are relatively long chains, the polymer is more likely to have pliable plastic properties. Alternatively, when the chains $R^{11}$ and $R^{12}$ are relatively short, the material will be more brittle.

The bridging group $B^2$ may alternatively comprise a tetra or octa substituted non-linear optic unit such as an optionally substituted porphyrin or phthalocyanine. Suitable optional substituents in addition to those mentioned in connection with formula (XI) are hydrocarbyl groups such as alkyl in particular methyl. An example of a monomer of formula (X) incorporating such a bridging group is a compound of formula (XIV):

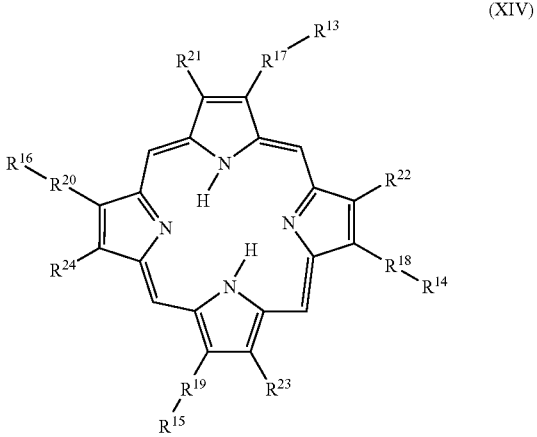

where $R^{13}$, $R^{14}$, $R^{15}$ and $R^{16}$ are as $R^9$ and $R^{10}$ in formula (XII); $R^{17}$, $R^{18}$, $R^{19}$ and $R^{20}$ are as $R^{11}$ and $R^{12}$ in formula (XII); and $R^{21}$, $R^{22}$, $R^{23}$ and $R^{24}$ are each independently selected from hydrogen or hydrocarbyl groups such as alkyl and in particular methyl. Such a compound may optionally contain a metal ion within the macrocyclic heterocyclic unit.

An alternative monomer (I) has the formula (XV):

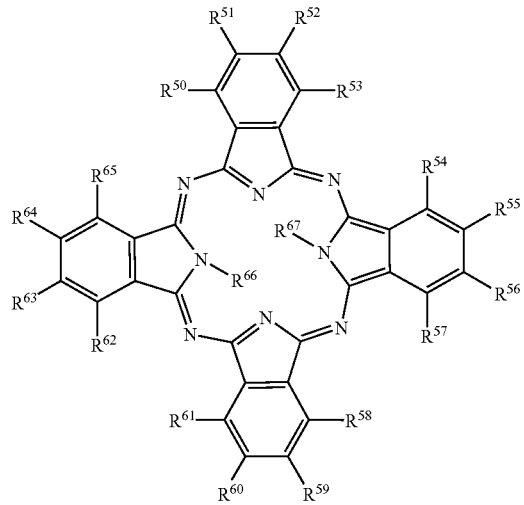

(XV)

where $R^{50}$ through to $R^{65}$ are each independently selected from hydrocarbyl, in particular $C_{1-12}$alkyl; a group $OR^{68}$ where $R^{68}$ is hydrocarbyl in particular butyl; halogen in particular chlorine; or a group $R^{11}$–$R^9$ where $R^{11}$ and $R^9$ are as defined in relation to formula (XII). At least one, preferably two or more of $R^{50}$ to $R^{65}$ are $R^{11}$–$R^9$ groups, and $R^{66}$ and $R^{67}$ are either hydrogen or together comprise a metal ion such as a copper ion.

Preferably in formula (XV), $R^{51}$, $R^{52}$, $R^{55}$, $R^{56}$, $R^{59}$, $R^{60}$, $R^{63}$ are halogen and $R^{50}$, $R^{53}$, $R^{54}$, $R^{57}$, $R^{58}$, $R^{61}$, $R^{62}$ and $R^{65}$ are independently $C_{1-12}$ alkyl, $C_{1-12}$ alkoxy or a group $R^{11}$–$R^9$.

Polymerisation of a monomer of formula (XIV) or (XV) together with a monomer of formula (II) can produce a very stable network or elastomeric material with robust physical properties. In addition to conductivity, such copolymers may be capable of exhibiting third order polarisabilities and may be suitable for applications which employ the Kerr effect. These properties can be affected or moderated when metals or metal ions are inserted into the macrocyclic heterocyclic unit. Suitable metal ions include sodium, potassium, lithium, copper, zinc and iron ions.

A further possibility for the bridging group $B^2$ is a polysiloxane network polymer where $R^1$ comprises a straight or branched siloxane chain of valency a or a cyclic polysiloxane unit.

Thus compounds of the formula (XVI) may also be used as the monomer (I):

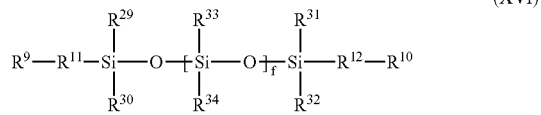

(XVI)

where $R^9$, $R^{10}$, $R^{11}$ and $R^{12}$ are as defined above in relation to formula (XII); $R^{29}$, $R^{30}$, $R^{31}$ and $R^{32}$ are independently selected from hydrocarbyl such as alkyl and in particular methyl; each $R^{33}$ or $R^{34}$ group is independently selected from hydrocarbyl or a group $R^{11}$–$R^9$ where $R^9$ and $R^{11}$ are as defined in relation to formula (XII); and f is 0 or an integer of 1 or more, for example of from 1 to 20.

So too may compounds of the formula (XVII):

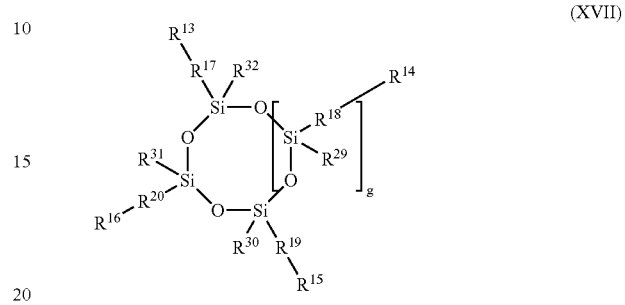

(XVII)

where $R^{13}$ through to $R^{20}$ are as defined in relation to formula (XIV); and $R^{29}$, $R^{30}$, $R^{31}$ and $R^{32}$ are as defined in relation to formula (XVI); and g is 0 or an integer of 1 or more, for example from 1 to 5. In a particular embodiment, formula (XVII) has four siloxane units in the ring (ie, g is 1). It will be appreciated that there may be other numbers of such units in the cyclic ring, for example from 3 to 8 siloxane units (g is from 0 to 5), preferably from 3 to 6 siloxane units (g is from 0 to 3).

In the above structures (XVI) and (XVII), it will be appreciated that —Si— may be replaced by B or B⁻; or —Si—O— by —B—N($R^{49}$)— where $R^{49}$ is a hydrocarbyl group or a group —$R^{11}$–$R^9$ as defined in relation to formula (XII).

Copolymerisation of monomers of formula (XVI) and (XVII) or variants thereof, with monomers of formula (II), may yield copolymers having properties similar to those of conventional siloxanes, but which may be coated onto surfaces and polymerised in situ, for example using radiation curing.

Other sorts of bridging groups $B^2$ include electrically conducting chains, for instance, electrically conducting unsaturated chains such as alkenes or chains incorporating aromatic or heterocyclic rings. For instance, the group $B^2$ may comprise a tetra substituted conducting unit such as a tertathiafulvalene. An example of a monomer (X) incorporating such a group is a compound of formula (XVIII):

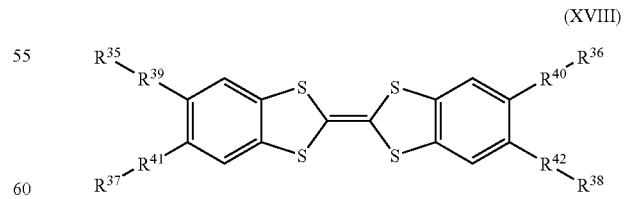

(XVIII)

where $R^{35}$, $R^{36}$, $R^{37}$ and $R^{38}$ are each as $R^9$ and $R^{10}$ in formula (XII) and $R^{39}$, $R^{40}$, $R^{41}$ and $R^{42}$ are independently selected from groups of formula (XI) as given above. In particular $R^{39}$, $R^{40}$, $R^{41}$ and $R^{42}$ may be alkyl, especially lower alkyl, groups.

Further examples of monomers of formula (X) include compounds of formula (XIX):

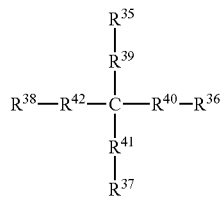

(XIX)

where $R^{35}$ through to $R^{42}$ are as defined in relation to formula (XVIII).

Yet further examples of monomers of formula (I), or rather of their unprotonated precursors (III), may be found in Table 2 and in the examples of WO-00/06533.

The above possibilities for the nature of $B^2$ apply equally to the bridging group $B^1$ of formula (IX).

Monomers of formula (III), as precursors to those of formula (I), may be prepared by conventional methods and from known and generally readily available starting materials. An example synthesis might for instance use a compound analogous to (III) in which $R^1$ is replaced by hydrogen or hydroxy, with the nitrogen atom optionally in the form of an amine precursor; react that analogue with a compound $R^1$–$Z^4$ (where $Z^4$ is a leaving group such as Cl or Br) which may correspond to the bridging group $B^2$ in the product; and if necessary convert the amine precursor to an amine. Examples of such a synthesis are disclosed in WO-00/06533.

In the foregoing description, the term "alkyl" refers to straight or branched chain alkyl groups, suitably containing up to 20 and preferably up to 6 carbon atoms, which may be substituted with one or more functional groups. The terms "alkenyl" and "alkynyl" refer to unsaturated straight or branched chains which include for example from 2 to 20 carbon atoms, in particular from 2 to 6 carbon atoms; these chains may include one or more double or triple bonds respectively. The term "aryl" refers to wholly or partially aromatic groups such as phenyl or naphthyl. The term "alkaryl" means an alkyl group having at least one (optionally substituted) aryl substituent, and the term "aralkyl" an aryl group having at least one (optionally substituted) alkyl substituent.

The term "lower", applied to the terms alkyl, alkenyl, alkynyl, aryl, alkaryl and aralkyl, means a group containing from 1 to 6 carbon atoms, preferably from 1 to 4.

The term "hydrocarbyl" refers to any structure comprising carbon and hydrogen atoms. For example, these may be alkyl, alkenyl, alkynyl, aryl such as phenyl or napthyl, alkaryl, aralkyl, cycloalkyl, cycloalkenyl or cycloalkynyl. Suitably they will contain up to 20 and preferably up to 10 carbon atoms. They may be substituted with other functional groups and they may include heteroatoms such as oxygen, nitrogen, sulphur, phosphorous or silicon within a carbon chain or ring.

The term "heterocyclyl" includes aromatic, partially aromatic or non-aromatic rings or mixtures thereof, for example containing from 3 to 20, suitably from 5 to 10 ring atoms, at least one of which is a heteroatom such as oxygen, sulphur, nitrogen, phosphorous or silicon. Examples of such groups include furyl, thienyl, pyrrolyl, pyrrolidinyl, imidazolyl, triazolyl, thiazolyl, tetrazolyl, oxazolyl, isoxazolyl, pyrazolyl, pyridyl, pyrimidinyl, pyrazinyl, pyridazinyl, triazinyl, quinolinyl, iosquinolinyl, quinoxalinyl, benzthiazolyl, benzoxazolyl, benzothienyl or benzofuryl.

The term "functional group" refers to reactive groups such as halo, cyano, nitro, oxo, $C(O)_nR^a$, $OR^a$, $S(O)_tR^a$, $NR^bR^c$, $OC(O)NR^bR^c$, $C(O)NR^bR^c$, $OC(O)NR^bR^c$, —$NR^7C(O)_nR^6$, —$NR^aCONR^bR^c$, —$C$=$NOR^a$, —$N$=$CR^bR^c$, $S(O)_tNR^bR^c$, $C(S)_nR^a$, $C(S)OR^a$, $C(S)NR^bR^c$ or —$NR^bS(O)_tR^a$ where $R^a$, $R^b$ and $R^c$ are independently selected from hydrogen or optionally substituted hydrocarbyl, or $R^b$ and $R^c$ together form an optionally substituted ring which optionally contains further heteroatoms such as $S(O)_s$, oxygen and nitrogen. In particular the functional groups are groups such as halo, cyano, nitro, oxo, $C(O)_nR^a$, $OR^a$, $S(O)_tR^a$, $NR^bR^c$, $OC(O)NR^bR^c$, $C(O)NR^bR^c$, $OC(O)NR^b R^c$, —$NR^7C(O)_nR^6$, —$NR^aCONR^bR^c$, —$NR^aCSNR^bR^c$, —$C$=$NOR^a$, —$N$=$CR^bR^c$, $S(O)_tNR^bR^c$, or —$NR^bS(O)_tR^a$ where $R^a$, $R^b$ and $R^c$ are as defined above. In this paragraph, n is an integer of 1 or 2 and s and t are independently 0 or an integer from 1 to 3.

A functional group may contain other heteroatoms such as phosphorous, silicon or boron. It may be reactive to or have an affinity for other chemicals or impart some functionality such as water solubility.

The term "heteroatom" as used herein refers to non-carbon atoms such as oxygen, nitrogen, sulphur, phosphorous, silicon or boron atoms. Where nitrogen atoms are present, they will generally be present as part of an amino residue so that they will be substituted for example by hydrogen or alkyl.

The copolymer of the present invention is preferably prepared from the mixture of (I) and (II) by radiation curing. Ultraviolet curing may be effected in the presence of a photoinitiator; this is a known technique and many suitable initiators are readily available, for example 2,2'-azobisisobutyronitrile (AIBN); aromatic ketones such as benzophenones in particular acetophenone; chlorinated acetophenones such as di- or tri-chloroacetophenone; dialkoxyacetophenones such as dimethoxyacetophenones (sold under the Trade name "Irgacure 651"); dialkylhydroxyacetophenones such as dimethylhydroxyacetophenone (sold under the Trade name "Darocure 1173"); substituted dialkylhydroxyacetophenone alkyl ethers such as compounds of the formula:

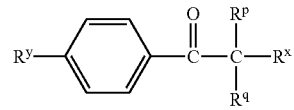

where $R^y$ is alkyl and in particular 2,2-dimethylethyl, $R^x$ is hydroxy or halogen such as chloro, and $R^p$ and $R^q$ are independently selected from alkyl or halogen such as chloro (examples of which are sold under the Trade names "Darocure 1116" and "Trigonal P1");

1-benzoylcyclohexanol-2 (sold under the Trade name "Irgacure 184"); benzoin or derivatives such as benzoin acetate, benzoin alkyl ethers in particular benzoin butyl ether, or dialkoxybenzoins such as dimethoxybenzoin or deoxybenzoin; dibenzyl ketone; acyloxime esters such as methyl or ethyl esters of acyloxime (sold under the Trade name "Quantacure PDO"); acylphosphine oxides, acylphosphonates such as dialkylacylphosphonate; ketosulphides for example of the formula:

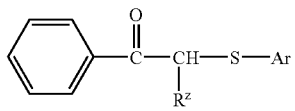

where $R^z$ is alkyl and Ar is an aryl group; dibenzoyl disulphides such as 4,4'-dialkylbenzoyldisulphide; diphenyldithiocarbonate; benzophenone; 4,4'-bis(N,N-dialkylamino)benzophenone; fluorenone; thioxanthone; benzil; or a compound of the formula:

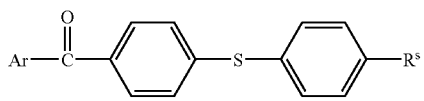

where Ar is an aryl group such as phenyl and $R^s$ is alkyl such as methyl (sold under the Trade name "Speedcure BMDS").

Other conventional polymerisation initiators, including free radical or ion initiators, may be employed.

Polymerisation initiators, where required, will be present in an amount which is sufficient to induce the required reaction in an appropriate time period. Typically, a monomer mixture in accordance with the invention will require from 1–10% w/w initiator, suitably about 4–6% w/w initiator, depending on the nature of the monomers (I) and (II), the type of initiator used, the intended function of the resultant polymer, etc.

The monomer/precursor mixtures of the invention may conveniently be polymerised in the substantial absence of solvents. This means that the copolymers of the invention may be prepared in situ, for instance on a substrate to which a copolymer is to be applied as a coating or an adhesive and to which the monomer/precursor mixture is firstly applied in the form of a paint. This is of particular use in a situation where the mixture is radiation curable and may be exposed in situ to for instance ultraviolet and/or visible radiation. For instance the mixture may be applied as a coating or adhesive to a transparent or translucent surface such as glass, or at a location to which radiation may be delivered, for instance via a fibre optic conductor, to effect curing.

By "in the substantial absence of solvents" is meant that there is either no solvent present or there is insufficient solvent present to completely dissolve the constituent monomers, although a small amount of a diluent may be present to allow the reagents to flow. The monomer/precursor mixture may be polymerisable in the substantial absence of aqueous and/or organic solvents.

Thermally curable monomer/precursor mixtures may be used in circumstances where they can readily be heated to an appropriate temperature, an example being in the production of laminates.

The monomer/precursor mixture is generally readily polymerisable, by which is meant that it will undergo polymerisation under moderate conditions of temperature and pressure (eg, room temperature and atmospheric pressure) in the presence of radiation and optionally an initiator, in a period of less than 24 hours, preferably less than 12 hours, more preferably less than four hours or less than one hour.

During the polymerisation process, the compounds of formula (I) are believed to link together generally via their terminal diene groups, as illustrated in FIG. 1, although the monomers of formula (II) are thought also to become associated with the links between individual monomer units (I). Because the compounds of formula (I) include at least two diene groups, they will tend to become cross-linked to form a network or three dimensional structure. The degree of cross-linking can be influenced by carrying out the polymerisation in the presence of cross-linkers, for instance of the general formula (X) above where for example a is greater than 2, for example 4, or by the inclusion of diluents, plasticisers or chain terminators. A chain terminator will suitably comprise a compound of formula (XX):

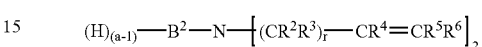

where $R^2$–$R^6$, r and a are as defined in relation to formula (X).

In the monomer mixture of (I)/(III) and (II)/(IV) there may be stoichiometrically equivalent amounts of the allylamine and the proton donating monomer. By this is meant that there are equivalent numbers of proton-accepting allylamine groups and proton donating groups, so as to achieve substantially complete protonation of the amine.

Varying the number ratio of the two functional groups can however be used to modify the properties of the resulting copolymer. For instance, it may be preferable to use a molar excess of the monomer (II)/(IV)—this may yield tougher (and yet in cases more flexible) polymers which are suitable as coatings or adhesives, and can increase the polymerisation rate; it can also affect the light transmitting properties of the polymers. Suitably between 1.1 and 10, or between 1.1 and 4, preferably between 1.5 and 2.5, times as many anion as cation functional groups may be present in the mixture, suitably a two-fold excess of the anion.

Alternatively, the ratio of anion to cation functional groups may be as low as 0.1:1, preferably no lower than 0.25:1, more preferably no lower than 0.5:1 or 0.75:1 or 0.8:1.

The copolymer of the invention, made from the monomer/precursor mixture, may therefore contain different amounts of the two constituent monomer repeat units, which may be randomly distributed throughout the polymer. Preferably it will contain at least four repeat units of each of the monomers (I) and (II), more preferably at least ten, most preferably at least twenty or fifty or a hundred.

The monomer/precursor mixture will typically contain at least 10% w/w, preferably at least 20% w/w or 30% w/w or 40% w/w or 50% w/w, of the monomer/precursor (I)/(III). Similarly, it suitably contains at least 10% w/w, preferably at least 20% w/w or 30% w/w or 40% w/w, of the monomer/precursor (II)/(IV).

Since the monomer (II)/(IV) acts as a proton donor to the monomer (I)/(III), generally in a monomer/precursor mixture according to the invention there may be no need for additional counterions such as might typically be present with a monomer such as (I). In other words, the mixture (and any composition prepared from it) may be substantially free of counterions such as halide, $PF_6^-$ and other inorganic anions.

However, in some cases counterions other than those of formula (II), for instance halides such as chloride or bromide, or $PF_6^-$ anions, may be included in the mixture instead of or in addition to some of those of formula (II), to tune the copolymer properties, in particular its permeability to water.

Particularly preferred mixtures of the monomers (I) and (II) or their precursors (III) and (IV) comprise either:
a) (protonated) diallylamine, triallylamine, dimethallyl amine, diallylmethylamine, diallylethylamine or diallylbutylamine, with a monomer (II)/(IV) other than acrylate, 3-hydroxypropyl acrylate, methacrylate, itaconate, vinyl acetate, maleate, fumarate, citraconate, 2-acrylamido-2-methyl propane sulphonate, vinyl sulphonate or (methyl)allyl sulphonate, in particular acrylate or methacrylate, or alternatively with a monomer (II)/(IV) of the formula (IX) or a vinyl sulphonate or phosphonate other than 2-acrylamido-2-methyl propane sulphonate, vinyl sulphonate or (methyl)allyl sulphonate; or
b) acrylic, 3-hydroxypropylacrylic, methacrylic, itaconic, vinyl acetic, maleic, fumaric, citraconic, 2-acrylamido-2-methyl propane sulphonic, vinyl sulphonic or (methyl)allyl sulphonic acid (more preferably acrylic or methacrylic acid) or the corresponding anion with a monomer (I)/(III) other than diallylamine, triallylamine, dimethallylamine, diallylmethylamine, diallylethylamine or diallylbutylamine, preferably a monomer (I)/(III) of the formula (X).

It is thus possible to incorporate a desired functionality into the resultant polymer, by incorporating that functionality in either the cationic or the anionic monomer, as desired.

In some cases the mixture may be other than: (i) triallylamine with acrylic or in cases also methacrylic acid, (ii) diallylamine with acrylic, methacrylic, itaconic or maleic acid, and/or (iii) diallylmethylamine and acrylic, methacrylic, maleic or citraconic acid (including in each case the corresponding ions).

The monomer/precursor mixture may contain more than one type of monomer of the general formula (I)/(III) and/or more than one of the general formula (II)/(IV). It may include additional materials such as diluents, plasticisers, polymerisation initiators and the like. It may even include additional polymerisable monomers, other than those of the formulae (I) and (II). However it conveniently consists essentially of the monomers (I)/(III) and (II)/(IV), with the only additional ingredients being minor amounts (eg, <10% w/w, preferably <5% w/w, more preferably <2% or 1% w/w) of for instance solvents and polymerisation initiators.

The monomer mixture will generally be stable (with respect to polymerisation) until suitable conditions, such as the introduction of a polymerisation initiator and/or exposure to radiation, occur. It may therefore be prepared in advance of the polymerisation step. Alternatively, it may be formed in situ at the time when polymerisation is to take place, for instance when it is to be used as a curable adhesive. The kit of the eighth aspect of the invention may therefore comprise either:
a) separately stored quantities of the monomers (I)/(III) and (II)/(IV), and optionally a separately stored polymerisation initiator;
b) separately stored quantities of the monomers (I)/(III) and (II)/(IV), with a polymerisation initiator optionally included with the monomer (II)/(IV) or more preferably with the monomer (I)/(III); or
c) a preformed mixture of the monomers (I)/(III) and (II)/(IV), and optionally a separately stored polymerisation initiator.

A significant advantage of the copolymers of the invention is the ability greatly to vary their properties by adjusting factors such as the nature and length of bridging groups $B^1$ and $B^2$ (which of course may be varied independently).

Modifications to the bridging groups can for instance alter the bonding and stereochemistry within the polymer, and hence its properties.

The presence of a second monomer, in addition to the allylamine, and of additional "associations" between functional groups on the two monomers, allow for significantly greater variability than is possible with the corresponding allylamine homopolymers. This in turn allows a greater diversity of uses for the copolymers of the present invention.

A variety of factors may affect the copolymer properties, in particular the nature of the A/W and $R^1$ groups. For example, groups $R^1$ (especially bridging groups) containing perhaloalkyl substituents such as perfluoroalkyl may increase water impermeability as compared to alkylene bridging groups optionally interposed with say oxygen. In contrast, the presence of hydroxy groups in $R^1$ may increase the water solubility of the copolymer and allow for the production of water based coatings, adhesives and sealants.

The nature of the monomer (II), which provides a counterion to the ammonium compound (I) but also participates in its polymerisation, can also affect the physical properties of the copolymer, such as its water retention, porosity or conductivity.

The copolymer properties may also depend on the amount of diluent, plasticiser or chain terminator present and on the polymerisation conditions employed to prepare it.

Further, since the copolymer may also contain repeat units formed from monomers other than those of formula (I) or (II), this may again be used to modify its properties.

In accordance with the present invention, it is possible to take a suitable organic system that has optimal or optimised properties for use in certain applications, eg, high yield strength, large hyperpolarisability, high pyroelectric coefficient, high conductivity etc, and to modify the system structurally so as to produce monomers of the general formulae (I) and/or (II). These can be mixed and polymerised so as to create a three dimensional network or plastic that will have properties associated with the parent organic system(s). Thus copolymer systems can be prepared which mimic, at least to an extent, conventional polymers or elastomers.

They may for instance be prepared in the form of films, having the properties of for example polyethylene films.

The versatility of the copolymer systems of the invention means that it is possible to build in anisotropy which would improve directional physical properties, eg, NLO (non-linear optical) properties, mechanical yield strength, etc. Both amorphous and ordered systems can be prepared depending upon the particular polymerisation conditions used.

Composites may also be produced by polymerising the monomer mixture of (I) and (II) in the presence of other moieties such as graphite, ethers such as crown ethers or thioethers, phthalocyanines, bipyridyls or liquid crystal compounds, all of which will produce composite copolymers with modified properties.

Generally speaking, because the copolymers of the invention have a cross-linked, network like structure, and more particularly because they contain additional bond-like associations between the double bonds of the monomers (I) and (II), they tend to be mechanically strong, hard and durable. This makes them effective coatings for a variety of substrates and a variety of purposes.

The copolymers may be water impermeable or substantially so. By "water impermeable" is meant that the copolymers preferably, when immersed in water, suffer a weight gain of no more than 10%, more preferably between 1% and 5%, most preferably between 1% and 2%, due to their uptake of water. Some may suffer a weight gain of 1% or less, for instance between 0 and 0.5% or between 0 and 0.2%. They can thus be of use as sealants and as protective coatings.

As coatings the copolymers of the invention may also be of use in thermal management, which is the control of optical properties of materials across solar and thermal wavebands (~0.7–12 microns). This control of transmitted, reflected and absorbed radiation gives the potential to design systems that can selectively perform different tasks at different wavelengths. For example, silver coatings are used by the glazing industry to limit solar transmission (material transparent at visible wavelengths but reflective across the solar) and thus prevent "greenhouse" heating. Other examples could be solar water heaters where the material is transparent at NIR wavelengths but reflective at longer wavelengths.

A coating composition according to the invention may have useful water-proofing, corrosion resistance and general dust and dirt protective properties, in particular where the constituent copolymer includes halogenated and particularly fluorinated bridging groups. In addition, coatings of this type may produce anti-icing features which are particularly useful if the coated substrate is to be exposed to harsh external conditions. Products treated in this way can also exhibit strong pearling qualities and this can assist in the rapid shedding of condensates.

Such coatings can be achieved on at least parts of the internal surfaces of a structure containing interconnecting interstitial spaces, such as a fibrous or granular material.

The copolymers of the invention also generally exhibit good adhesive properties. An adhesive composition according to the invention, comprising such a copolymer, is a glue-like material which, when interposed between surfaces, will hold the surfaces together. The resulting bond between the surfaces is sufficiently strong and will remain in place for a period of time which is appropriate for the desired application. Surfaces which may be adhered using the copolymers of the invention include in particular glass, but also metal, wood, paper, card, ceramics, plastics, laminates, stone and construction materials, as well as biological materials such as tissue, and mixtures of any of these.

Adhesive compositions in accordance with the invention can be used in a variety of applications, depending upon the precise nature of the constituent monomers. For example, they may be used in the production of laminates and shatter-proof glass. By including a charged group in the monomer of formula (I), for instance, the adhesive may be used to provide an electrically conducting layer.

In biomedical fields, biocompatible copolymers or monomer mixtures in accordance with the invention may for example be used to adhere molds or splints in place, or to adhere tissues, or in the formation of internal welds.

A sealant composition according to the seventh aspect of the invention is a composition which may be applied to a surface to form a protective barrier thereon, for example to prevent ingress or egress of solid, liquid or gaseous material or alternatively to allow selective permeability through the barrier to gas and/or liquid. In particular, it may provide a seal between two or more adjacent surfaces.

Adhesive, coating or sealant compositions of the invention may include additional materials such as solvents, plasticisers, polymerisation initiators, chain terminators, dyes, fillers, viscosity modifiers, stabilisers, protectants and/ or other adhesive, coating and/or sealant materials. They may include water as a solvent. However, where one of the constituent monomers has a relatively high viscosity, an organic solvent such as dichloromethane, acetone, tetrahydrofuran etc. may be present in order to ensure that the composition is homogenous and will spread well. Suitably, any solvent will be present in an amount of from 200 to 300% w/w.

Thus, the preparation method of the ninth aspect of the invention may involve mixing one or more such additional materials with the monomer/precursor mixture of the third aspect and/or with the resultant copolymer.

It may be preferred for the compositions of the seventh aspect of the invention to be substantially free of solvents. Some may be substantially free of organic solvents but optionally contain an aqueous solvent; others may be substantially free of aqueous solvents but optionally contain one or more organic solvents.

In such compositions, the copolymer of the first aspect of the invention, or the monomer/precursor mixture, is suitably the main active ingredient (for instance, in an adhesive composition, it is the primary adhesive ingredient), rather than being present as a coactive, catalyst, cross-linking agent or other additive in a mixture which includes other active ingredients. Thus, it can be suitable for the composition to contain greater than 60% w/w, preferably greater than 70% w/w, more preferably greater than 80 or 90% w/w, of the copolymer or of the monomer/precursor mixture. The composition may consist essentially of, even containing up to 100% of, the copolymer or the monomer/precursor mixture, suitably up to 80% or 90% or 95% or 98% or 99% w/w.

Monomer/precursor mixtures according to the third aspect of the invention may be free, or substantially so, of additional unsaturated compounds, in particular compounds containing carbon-carbon double or triple bonds. They may also be free of acrylamides. They may also be free of other ion pairs, in particular ampholitic ion pairs. The adhesive, coating or sealant compositions according to the invention may therefore be free, or substantially so, of such additional compounds and/or polymers derived from them and/or other derivatives of them.

Encompassed within the tenth aspect of the invention is a method of adhering surfaces to one another and/or of applying a seal between them, the method comprising applying to at least one surface a monomer/precursor mixture according to the third aspect, contacting that treated surface with another surface to which it is to be adhered and/or sealed, and allowing the monomer/precursor mixture to polymerise. This may be achieved by applying the monomer (I)/(III) to one surface and the monomer (II)/(IV) to another, and allowing the monomers to mix in situ on bringing the two surfaces into contact.

The present invention provides, according to its eleventh aspect, a product coated with a copolymer according to the first aspect or a mixture according to the third or a composition according to the seventh aspect. Suitable products include fabrics or items made from fabric, electrical components or devices, mechanical components and construction or building materials. Particular examples are small electrical components such as resistors, capacitors, condensers, circuit breakers, switches and connectors, as well as small assemblies thereof, for example circuit boards on which these and/or other components are mounted; electrical devices including conductors, such as HT leads as used for example in automobile engines, and cables such as external or underground power cables; and electronic components such as printed circuit boards, semiconductor elements, optical devices, videodiscs, compact discs, floppy discs and the like.

Copolymers containing monomers (I) which mimic polypropylene can be particularly useful for the coating of electrical wiring.

Moreover, the copolymers of the invention may be of use in providing either resistive or conducting layers on electrical or electronic components, the nature of the bridging groups present affecting the resistance of the copolymer layer. Those exhibiting electrical conducting properties may for instance be suitable as organic semiconductors, for example for use as interconnects for IC chips.

Additional resistance to etching by plasma etch processes, as are commonly used in producing semiconductor devices such as integrated circuits, may be achieved if the bridging groups $B^1$ and/or $B^2$ are aromatic or heteroaromatic, i.e., if they include one or more unsaturated carbon rings, optionally containing heteroatoms such as nitrogen, oxygen or sulphur.

Mechanical components which may be coated with copolymers according to the invention include housings, bearings, shafts, gears, wheels, gaskets, filter housings, engines, gearboxes and transmission, steering or suspension components.

Building materials include wood, brick, concrete slabs or other preformed concrete structures, building blocks, stone, slates or insulation materials, particularly in situations where corrosion, weathering or water penetration is likely to cause problems.

A coating applied in accordance with the invention may if necessary be discontinuous, for example, patterned by etching, optionally after masking certain areas, so as to provide desired electronic properties. Techniques for achieving this are well known, and include for example irradiation with high energy radiation such as electron beams, X-rays or deep ultraviolet rays. The irradiation breaks the bonds in the copolymer and exposed areas can then be dissolved in a developer liquid. Optionally, the coating may consist of a mixture of the requisite monomers and a chemical designed to enhance their sensitivity to radiation exposure during the patterning process, such as quinone diazide or anthraquinone.

The copolymers of the invention, and the monomer mixtures from which they may be formed, are also of use in stereolithography, particularly so because of their potentially high strength and hardness.

The use of stereolithography to produce three-dimensional objects is well known. Broadly speaking, a requisite amount of controlled light energy is applied to a liquid photocurable resin to harden it. This may be done in a series of steps, each of which forms a thin layer of hardened resin on top of a base layer. A layer of liquid photocurable resin is applied to a hardened layer and then irradiated under control to harden the resin in the form of a thin layer which is integrally superposed on the previously formed layer. This process can be repeated until a desired three-dimensional object is built up.

A stereolithographic composition according to the invention may include, inter alia, a solvent such as an alcohol like ethanol, to make it workable for use in a stereolithographic process.

Further additives which may be present include stabilisers such as additives intended to prevent shrinkage of a three-dimensional object obtained by stereolithography. Such additives may include components which are soluble in the composition but separate from the composition on hardening to form a different phase, such as those described in JP-A- 3-20315. Polymeric coagulating materials which coagulate when heated, such as those described in JP-A-3-104626, may also be present.

Other potential additives include polarising substances which control light irradiation. These may be helpful in optimising the balance between the use of high light energy (needed to allow the process to proceed rapidly) and the need to maintain a uniform penetration depth. Examples of such compounds and their efficacy are described for instance in JP-A-3-15520, JP-A-3-41126, JP-A-3-114732 and JP-A-3-114733.

A stereolithographic composition according to the invention may be used in a variety of conventional stereolithographic applications, for the production of three dimensional objects such as plastic moulds, for example those used in the production of prototype devices such as domestic electrical appliances etc., intended for mass production. They may be used for instance in the formation of semi-conductor products, allowing the formation of features on a substrate surface without the use of conventional patterning methods that require several process steps such as plasma ashing and chemical etching.

Suitable stereolithographic apparatus and conditions are well known in the art.

Embodiments of the present invention will now be illustrated with reference to the following experimental examples.

The accompanying FIG. 1 illustrates schematically the associations thought to exist between repeat units in a copolymer according to the invention.

EXAMPLES

In the following coating examples, it was of note that the product copolymers were much harder than the corresponding diallylamine homopolymers would have been. This indicates that the proton donating anions function not only as counterions to the ammonium monomers, but are also involved in the polymer bonding.

Example 1

Copolymerisation, using ultraviolet radiation, of a diallylamine monomer and itaconic acid, to produce a hard coating.

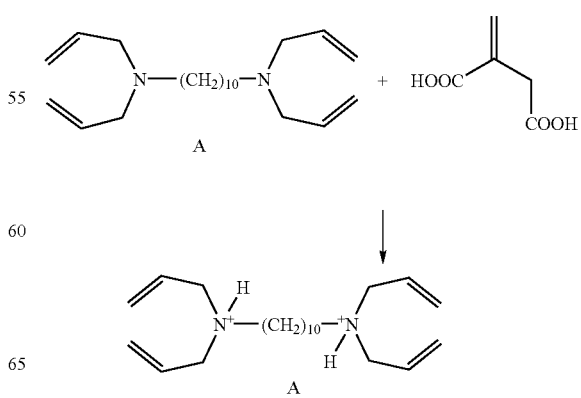

-continued

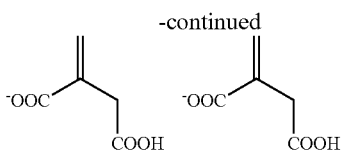

| Monomer A | 3.70 g (0.011 mol) |
| Itaconic acid | 2.86 g (0.022 mol) |

Monomer A and itaconic acid were placed in methanol (50 cm³). The itaconic acid, insoluble at first, slowly dissolved as it reacted with the diallylamine compound to form a clear, colourless solution. The solvent was removed in vacuo to leave a viscous, clear, colourless oil.

IR $v_{max}$ (thin film) 3600–2800, 2935, 2863, 1716, 1569, 1467, 1209, 998, 945, 754, 665, 556 cm$^{-1}$.

$^1$H nmr (CDCl$_3$) δ: 1.29 (s, br, 12H), 1.65 (s, br, 4H), 2.10(s, br, 4H), 2.90 (m, 4H), 3.40 (s, 4H), 3.65 (d, 8H), 5.55 (m, 8H), 5.90 (r, 4H), 6.05 (s, 2H), 12.00 –12.500 (br~2H).

The resulting mixture of the protonated monomer A and the itaconate was polymerised in the presence of the photoinitiator Irgacure™ 184:

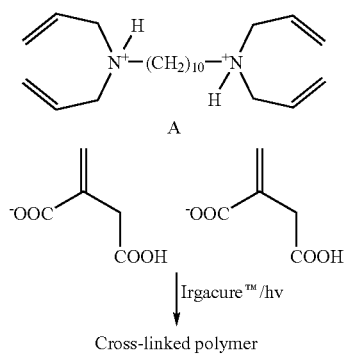

| Monomer A | 1.0 g |
| Irgacure ™ 184 (Ciba Geigy) (5% w/w) | 50 mg |

The initiator and the monomer mixture were warmed together to achieve a homogeneous solution and the mixture was spread on a plate glass plate to cover an area 20×10 cm. The monomer/photoinitiator film was irradiated with a Philips UVA sunlamp (75 W) for 30 minutes. The resultant polymer was removed (scalpel) in small strips.

IR $v_{max}$ (KBr disc) 3600–2800, 2940, 2860, 1700, 1610, 1575, 1415, 1200, 1060, 990, 963, 818, 760 cm$^{-1}$.

Example 2

Copolymerisation, using ultraviolet radiation, of diallylamine and di-itaconate monomers to produce a hard coating.

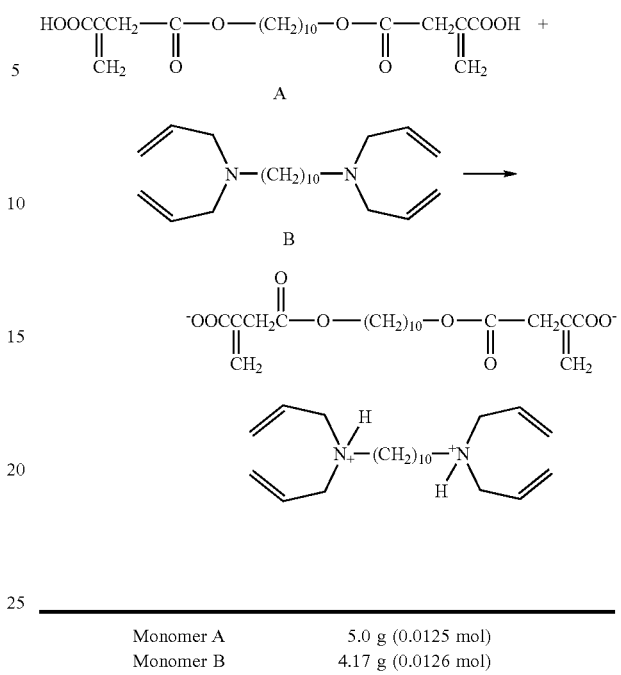

| Monomer A | 5.0 g (0.0125 mol) |
| Monomer B | 4.17 g (0.0126 mol) |

Monomer A was placed in methanol (100 cm³) but did not dissolve. Monomer B in methanol was added slowly with immediate effect on Monomer A which dissolved as the salt combination was formed. Yield 9.10 g, 100%.

IR $v_{max}$ (thin film) 3400, 2934, 2861, 1738(s), 1575, 1422, 1158, 999, 940 cm$^-$.

2 g of the resulting mixture of monomer salts was dissolved in dichloromethane (3 cm³) and polymerised in the presence of Irgacure™ 184 (150 mg, as used in Example 1). The mixture was warmed to achieve complete dissolution, and then spread evenly on an 18×25 cm plate glass plate and the solvent allowed to evaporate off in air over 1 hour. The monomer film remaining was subjected to UVA radiation (Philips UVA 75 W) for 3 minutes to form a hard coating of the cross-linked hybrid diallylamine/acrylate polymer.

IR $v_{max}$ (KBr disc) 3457, 2929, 2859, 1736(s), 1471, 1385, 1178, 556, 469 cm$^{-1}$.

Example 3

Copolymerisation, using ultraviolet radiation, of triallylamine and a di-itaconate, to produce a hard, clear coating.

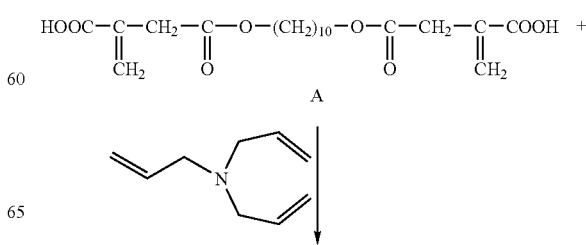

-continued

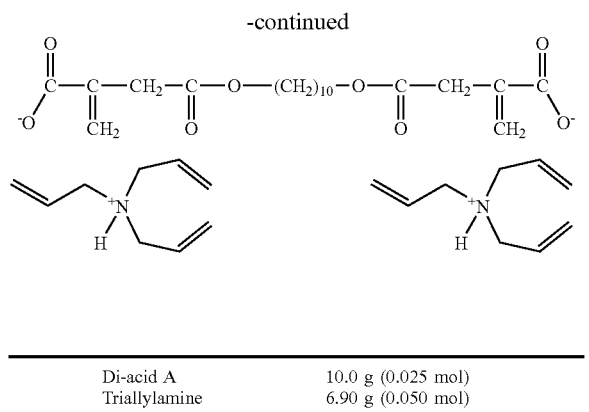

| Di-acid A | 10.0 g (0.025 mol) |
|---|---|
| Triallylamine | 6.90 g (0.050 mol) |

Di-acid A and triallylamine were placed in ethanol (150 cm³) and the mixture was stirred at room temperature until a clear solution was formed. The solvent was removed in vacuo to leave a heavy, pale yellow oil which was dried thoroughly. Yield 16.90 g, 100%.

IR $v_{max}$ (thin film) 3400–3200, 2935, 2861, 2480, 1733(s), 1641, 1568, 1426, 1195, 946, 825, 559 cm$^{-1}$.

1.0 g of the resulting mixture of monomer salts was polymerised in the presence of Irgacure™ 184 (50 mg, as used in Example 1). The initiator and the monomer mixture were heated together and mixed to ensure complete homogeneity. The combination was spread on an 18×25 cm plate glass plate to cover an area of ~20×1 cm. It was then warmed to achieve even-thickness then irradiated with a Philips UVA (75 W) sunlamp for ~1 hour. The surface of the resultant polymer coating was wiped with a dichloromethane soaked cloth to remove surface stickiness. A hard, clear coating of the cross-linked copolymer remained.

IR $v_{max}$ (KBr disc) 3400–3200(s), 2936, 2862, 1736(s), 1454, 1181 cm$^{-1}$.

Example 4

Copolymerisation, using ultraviolet radiation, of a diallylamine monomer and methacrylic acid, to produce a hard polymer film.

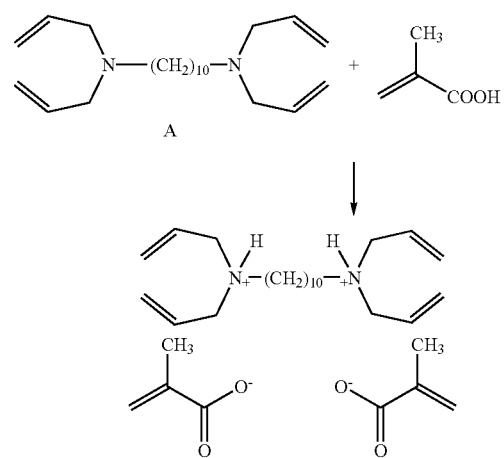

| Monomer A | 10.0 g (0.0301 mol) |
|---|---|
| Methacrylic acid | 5.20 g (0.0602 mol) |

Monomer A and methacrylic acid were placed in methanol (75 cm³) and the combination was stirred for 30 minutes. The solvent was removed in vacuo to leave a clear, yellow oil. Yield 15.20 g, 100%.

IR $v_{max}$ (thin film) 3600–3200, 2934, 2862, 1705(s), 1639, 1562, 1455, 1411, 1300, 1194, 1000, 932, 796 cm$^{-1}$.

1.0 g of the resulting mixture of monomer salts was polymerised in the presence of Irgacure™ 184 (50 mg, as used in Example 1). The initiator and the monomer mixture were warmed together to ensure complete dissolution and the solution was spread on a plate glass plate to cover an area ~10×10 cm. The monomer/photoinitiator film was irradiated with a Philips UVA (75 W) sunlamp for ~1 hour. The resultant cross-linked polymer film was removed as brittle strips (scalpel).

IR $v_{max}$ (KBr disc) 3400–3200, 2940, 2860, 1610, 1575, 1412, 1190, 1060, 990, 963, 815, 760, 660 cm$^{-1}$.

Example 5

Copolymerisation, using ultraviolet radiation, of diallylamine and a di-itaconate monomer, to produce a hard, clear polymer coating.

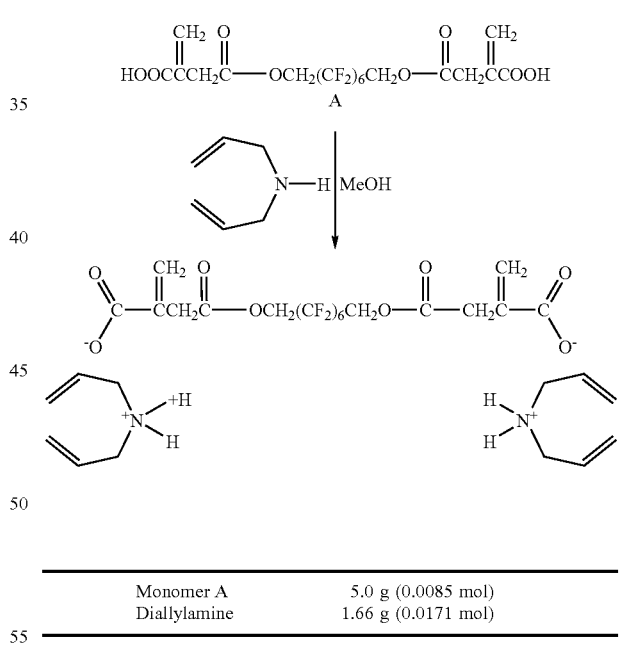

| Monomer A | 5.0 g (0.0085 mol) |
|---|---|
| Diallylamine | 1.66 g (0.0171 mol) |

Monomer A was placed in methanol (75 cm³) but did not dissolve. Diallylamine in methanol (20 cm³) was added slowly to form a clear solution as the salt formed. The combination was stirred for 1 hour. Removal of solvent in vacuo followed by thorough drying gave 5.66 g, 100% yield, of yellow oil.

IR $v_{max}$ (thin film) 3400–3200, 2993, 1720, 1617, 1423, 1201, 1144, 996, 945 cm$^{-1}$.

1.0 g of the resulting mixture of monomer salts was polymerised in the presence of Irgacure™ 184 (50 mg, as used in Example 1), by the method used in Example 3 but spreading the initiator/monomer mixture over an area of 10×10 cm. A hard, clear cross-linked polymer coating remained.

IR $v_{max}$ (KBr disc) 3600–3200(s), 2947, 1762, 1583, 1454, 1201, 1144, 706 cm$^{-1}$.

Example 6

Copolymerisation using ultraviolet radiation, of triallylamine and a di-itaconate monomer, to produce a hard, clear polymer coating.

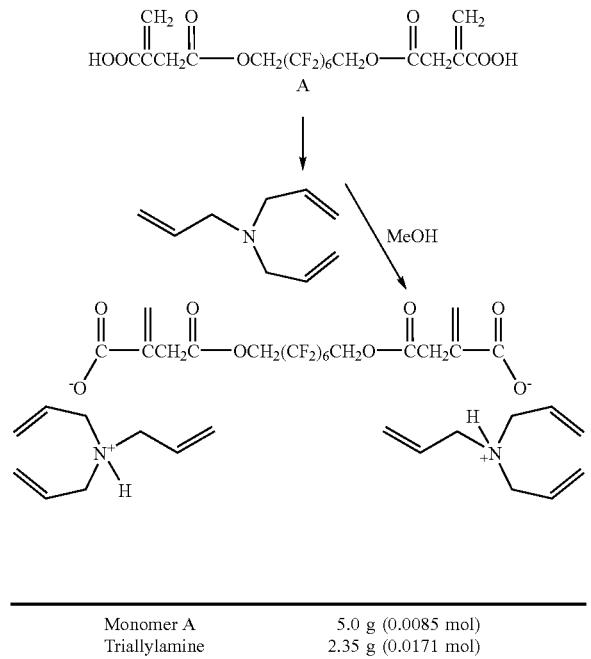

| Monomer A | 5.0 g (0.0085 mol) |
| Triallylamine | 2.35 g (0.0171 mol) |

Example 5 was repeated but using 2.35 g (0.0171 mol) triallylamine in place of diallylamine. Yield of monomer mixture: 7.35 g, 100%, yellow oil.

IR $v_{max}$ (thin film) 3400–3200, 2995, 1727, 1582, 1455, 1201 cm$^{-1}$.

1.0 g of this mixture of monomer salts was polymerised as in Example 5. A hard, clear cross-linked polymer coating remained.

IR $v_{max}$ (KBr disc) 2600–3200(s), 2943, 1760, 1583, 1454, 1201, 1144, 706 cm$^{-1}$.

Example 7

Copolymerisation of a diallylamine monomer and acrylic acid, in non-stoichiometrically equivalent amounts, to produce a hard coating.

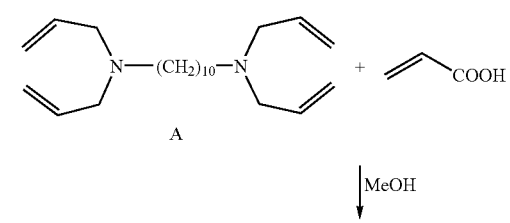

-continued

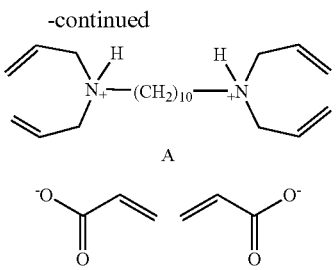

| Monomer A | 10.0 g (0.025 mol) |
| Acrylic acid | to pH 3.0 |

Monomer A was dissolved in methanol (50 cm$^3$) and the pH was adjusted with acrylic acid to pH 3.0 (universal indicator paper). This yielded a mixture containing a stoichiometric excess of the acrylate anion. The solvent was removed in vacuo to leave a clear colourless oil.

IR $v_{max}$ (thin film) 3400–3200, 2937, 2864, 1728, 1572, 1411, 1194, 1059, 991, 813, 756, 665, 482 cm$^{-1}$.

$^1$H nmr (CDCl$_3$) δ: 1.25 (m, 12H), 1.69 (s, br 2H), 2.70 (t, 4H), 2.95 (m, 2H), 3.70 (d, 4H), 4.30 (m, 4H), 5.47 (m, 4H), 5.82 (m, 4H), 5.95 (m, 2H), 6.14 (m, 4H) 6.39 (m, 4H), 12.55 (s, 2H).

1.0 g of the resulting mixture of monomer salts was polymerised in the presence of Irgacure™ 184(50 mg, as used in Example 1). The initiator and the monomer mixture were warmed together to achieve complete dissolution and the solution was spread on a plate glass plate to cover an area of 20×10 cm. The monomer/photoinitiator film was irradiated with a Philips UVA sunlamp (75 W) for 30 minutes. The resultant cross-linked polymer was removed as hard, brittle fragments (scalpel).

IR $v_{max}$ (KBr disc) 3400–3200, 2940, 2860, 1610, 1575, 1410, 1200, 1060, 990, 963, 815, 760, 660, 627 cm$^{-1}$.

Example 8

Copolymerisation, using ultraviolet radiation, of a diallylamine monomer and a CF$_3$-substituted acrylate monomer, to produce a hard polymer film coating.

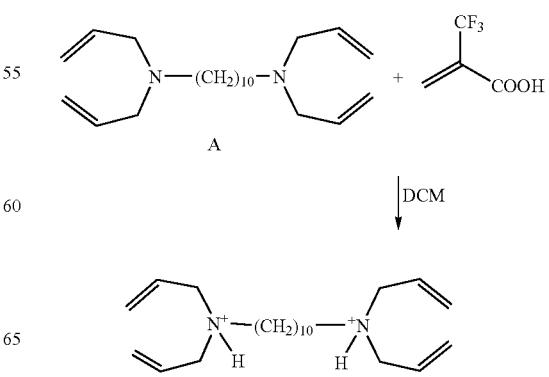

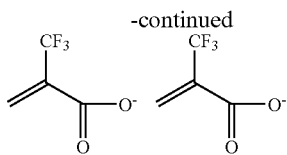

| Monomer A | 2.95 g (0.0089 mol) |
| 2-(trifluoromethyl) acrylic acid | 2.50 g (0.0178 mol) |
| Dichloromethane | 25 cm³ |

Monomer A and 2-(trifluoromethyl) acrylic acid were placed in dichloromethane to form a clear solution. The solution was filtered (Whatman No. 1 filter paper) and the solvent was removed in vacuo to leave a clear, colourless oil. Yield 5.45 g, 100%.

IR $v_{max}$ (thin film): 3088, 2934(s), 2863, 2491(br), 1760(s), 1646, 1463, 1233, 996 cm$^{-1}$.

$^1$H nmr (CDCl$_3$) δ: 1.50 (s, br, 12H), 1.60 (s, br, 4H), 2.60 (s, br, 4H), 2.95 (m, 8H), 5.40 (m, 10H), 5.90 (m, 6H), 9.50 (s, br, 2H).

0.5 g of the resulting mixture of monomer salts was polymerised in the presence of Irgacure™ 184 (25 mg, as used in Example 1). The monomer mixture and the initiator were warmed together with shaking to ensure complete homogeneity. The mixture was spread evenly on a small glass plate to cover an area of 6×6 cm. The monomer film was exposed to a Philips UVA sunlamp (75 W) for 10 minutes. The resultant cross-linked copolymer film was wiped with a cloth containing dichloromethane in order to remove surface stickiness. The cross-linked polymer network was removed as hard, brittle, pieces.

IR $v_{max}$ (KBr disc): 3450, 2943(s), 2669(br), 1627, 1437, 1253, 1161, 1113, 661 cm$^{-1}$.

Example 9

Copolymerisation, using ultraviolet radiation, of diallylamine and vinyl phosphonate monomers, to produce a flexible polymeric film coating.

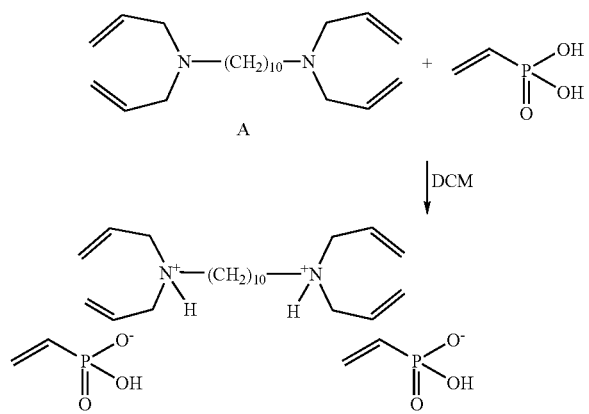

| Monomer A | 5.0 g (0.0151 mol) |
| Vinyl phosphonic acid | 3.26 g (0.0301 mol) |
| Dichloromethane | 25 cm³ |

Monomer A and vinyl phosphonic acid were placed in dichloromethane to form a clear, colourless solution. The solution was filtered (Whatman No. 1 filter paper) and the solvent removed in vacuo to leave a clear colourless oil. Yield 8.26 g, 100%. IR $v_{max}$ (thin film): 3600–3100, 2936, 2862, 2371(br), 1701, 1463(s), 1232(s), 1140, 1049, 950 cm$^{-1}$.

$^1$H nmr (CDCl$_3$) δ: 1.20 (s, br, 12H), 1.75 (s, br, 4H), 2.80 (m, 4H), 3.50 (m, 8) 5.50 (m, 8H), 5.60 (m, 2H), 6.10 (m, 4H), 6.25 (m, 4H), 12.10 (s, br, 4H).

0.50 g of the resulting mixture of monomer salts was polymerised as in Example 8, to give a cross-linked copolymer network. The polymeric film was found to be a flexible material.

IR $v_{max}$ (KBr disc): 3600–3200, 2935, 2864, 2332(br), 1682, 1467(s), 1240(s), 1127(s), 1065(s), 917 cm$^{-1}$.

Example 10

Copolymerisation, using ultraviolet radiation, of diallylamine and vinyl sulphonate monomers, to produce a flexible polymeric film coating.

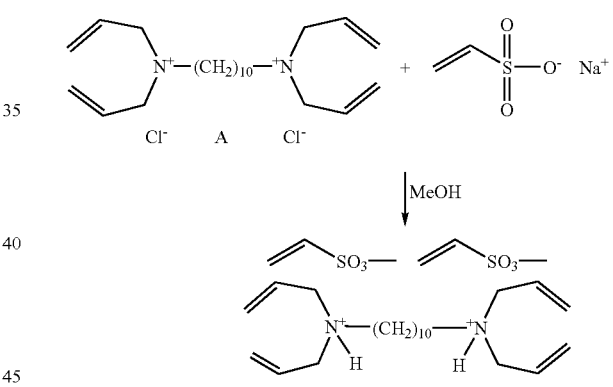

| Monomer A | 5.0 g (0.0124 mol) |
| Vinyl sulphonic acid sodium salt | 3.25 g (0.025 mol) |
| (25 wt % solution in H$_2$O) | |

Monomer A was dissolved in methanol (50 cm³). Vinyl sulphonic acid sodium salt in H$_2$O was added and the combination was stirred for 30 minutes. The solvents were removed in vacuo and the residue was placed in dichloromethane and stirred for 30 minutes. Solids were removed by filtration (Whatman No. 1 filter paper). The filtrate was dried over MgSO$_4$ and filtered again (Whatman No. 1 filter paper). Removal of solvent in vacuo gave a yellow oil, 5.79 g, 86% yield.

IR $v_{max}$ (thin film): 3600–3400, 2934, 2800–2400, 1690, 1465, 1215, 1170(s), 1040, 950, 746, 663 cm$^{-1}$.

$^1$H nmr (DMSO) δ: 1.10 (s, 12H), 1.65 (s, br, 4H), 2.80 (s, br, 4H), 3.50 (m, 8H), 5.0 (m, 2H), 5.40 (m, 10H), 5.90 (m, 4H), 6.40 (m, 2H), 10.25 (s, br, 2H).

0.5 g of the resulting mixture of monomer salts was polymerised as in Example 8. The resulting polymeric film was removed as strips (scalpel) and found to be a flexible material.

IR $v_{max}$ (KBr disc): 3600–3200, 2935, 1461, 1680, 1460, 1210, 1160(s), 1040, 718 cm$^{-1}$.

Example 11

Preparation of a monomer mixture (diallylamine and acrylic acid) suitable for use as an adhesive.

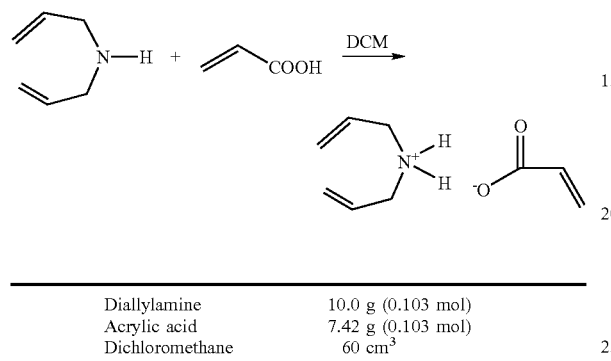

| Diallylamine | 10.0 g (0.103 mol) |
| Acrylic acid | 7.42 g (0.103 mol) |
| Dichloromethane | 60 cm$^3$ |

Diallylamine was placed in dichloromethane and the solution cooled to 0° C. (salt/ice bath). Acrylic acid was added over 10 minutes dropwise. On complete addition, the solution was stirred for a further 10 minutes then the solvent was removed in vacuo to leave a yellow oil. Since the two starting materials were 98–100% pure, no purification was necessary. Yield 17.20 g, 99%.

IR $v_{max}$ (thin film) 3400–3200, 2984, 2814, 1732, 1587, 1395, 1198, 998, 927, 737, 481 cm$^{-1}$.

$^1$H nmr (CDCl$_3$) δ: 2.55 (t, 2H), 2.95 (t, 2H), 3.35 (d, 3H), 5.30 (m, 4H), 5.95 (m, 2H), 11.65(s, br, 2H).

Polymerisation of this mixture, using ultraviolet radiation in the presence of Irgacure™ 184, resulted in a copolymer having good adhesive properties.

Example 12

Preparation of a monomer mixture (diallylamine and itaconic acid) suitable for use as an adhesive.

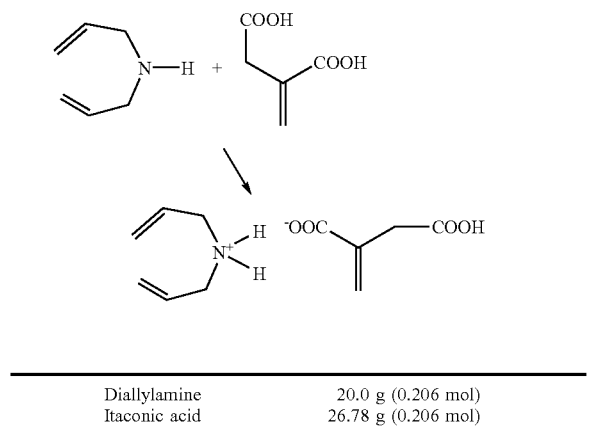

| Diallylamine | 20.0 g (0.206 mol) |
| Itaconic acid | 26.78 g (0.206 mol) |

Diallylamine and itaconic acid were dissolved in methanol (120 cm$^3$). The solvent was removed in vacuo to leave a heavy, yellow oil. Yield 46.5 g, 100%.

IR $v_{max}$ (thin film) 3600–3200, 2830, 1715, 1572, 1393, 1032, 945, 630 cm$^{-1}$.

$^1$H nmr (CDCl$_3$) δ: 3.30 (s, 11H), 3.45 (s, 1H), 3.60 (m, 4H), 5.40 (m, 5H), 5.90 (m, 3H), 9.60 (s, 2H), 11.80 (s, br, 1H).

Polymerisation of this mixture, using ultraviolet radiation in the presence of Irgacure™ 184, resulted in a copolymer having good adhesive properties.

Example 13

Preparation of a mixture of diallylaminoalcohol and itaconic acid monomers, suitable for use as an adhesive.

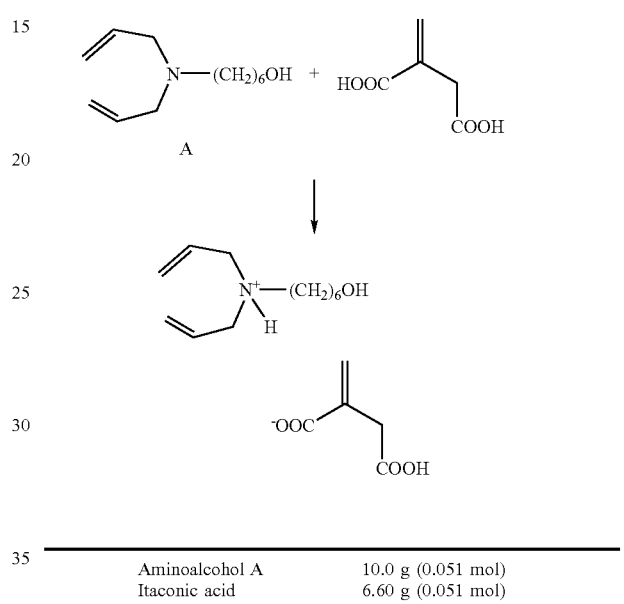

| Aminoalcohol A | 10.0 g (0.051 mol) |
| Itaconic acid | 6.60 g (0.051 mol) |

Aminoalcohol A and itaconic acid were dissolved in methanol (100 cm$^3$). The solvent was removed in vacuo to leave a heavy pale yellow oil. Yield 16.50 g, 99%.

IR $v_{max}$ (thin film) 3300–2600, 2943, 1717, 1567, 1427, 1211, 1056, 949, 827, 733, 648 cm$^{-1}$.

Polymerisation of this mixture, using ultraviolet radiation in the presence of Irgacure™ 184, resulted in a copolymer having good adhesive properties.

Example 14

Preparation of a mixture of triallylamine and itaconic acid monomers, suitable for use as an adhesive.

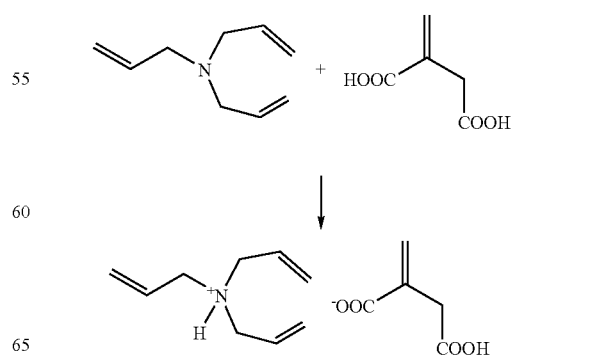

| | |
|---|---|
| Triallylamine | 20.0 g (0.146 mol) |
| Itaconic acid | 18.96 g (0.146 mol) |

Triallylamine and itaconic acid were placed in methanol (100 cm³) and the mixture was stirred at room temperature until a clear solution was formed. The solvent was removed in vacuo to leave a clear, yellow oil which was dried thoroughly. Yield 38.95 g, 100%.

IR $\nu_{max}$ (thin film) 3600–3200, 2996, 2800–2400(br), 1775, 1719(s), 1462, 1313, 1207, 950, 823, 675 cm$^{-1}$.

Polymerisation of this mixture, using ultraviolet radiation in the presence of Irgacure™ 184, resulted in a copolymer having good adhesive properties.

Example 15

Preparation of a mixture of triallylamine and methacrylic acid monomers, suitable for use as an adhesive.

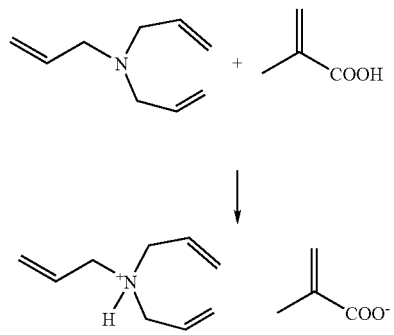

| | |
|---|---|
| Methacrylic acid | 12.48 g (0.145 mol) |
| Triallylamine | 20.0 g (0.145 mol) |

Methacrylic acid and triallylamine were placed in methanol (100 cm³) and the combination was stirred at room temperature for 30 minutes. The solvent was removed in vacuo to leave a clear, yellow oil. Yield 32.48 g, 100%. The oil was dried thoroughly.

IR $\nu_{max}$ (thin film) 3600–3200, 2933, 2480, 1706(s), 1637, 1559, 1456, 1411, 1299, 1193, 1001, 942, 794, 605, 538 cm$^{-1}$.

Polymerisation of this mixture, using ultraviolet radiation in the presence of Irgacure™ 184, resulted in a copolymer having good adhesive properties.

Example 16

Preparation of a mixture of triallylamine and acrylic acid monomers, suitable for use as an adhesive.

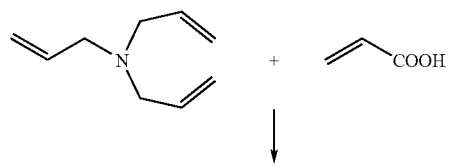

-continued

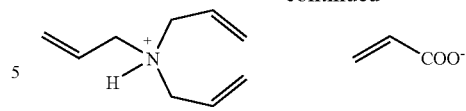

| | |
|---|---|
| Acrylic acid | 10.50 g (0.145 mol) |
| Triallylamine | 20.0 g (0.145 mol) |

Acrylic acid and triallylamine were placed in methanol (100 cm³) and the combination was stirred for 30 minutes. The solvent was removed in vacuo to leave a yellow, clear oil which was dried thoroughly. Yield 30.50 g, 100%.

IR $\nu_{max}$ (thin film) 3600–3200, 2991, 1728, 1568, 1414, 1197, 993, 816, 664 cm$^{-1}$.

Polymerisation of this mixture, using ultraviolet radiation in the presence of Irgacure™ 184, resulted in a copolymer having good adhesive properties.

Example 17

Preparation of a mixture of diallylamine and methacrylic acid monomers, suitable for use as an adhesive.

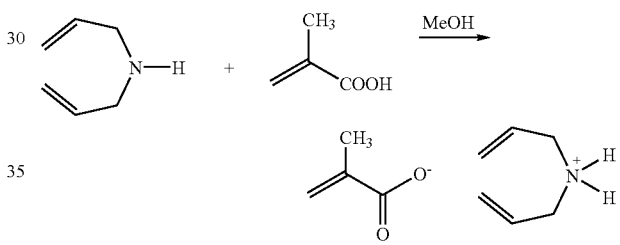

| | |
|---|---|
| Diallylamine | 10.0 g (0.103 mol) |
| Methacrylic acid | 8.86 g (0.103 mol) |

Diallylamine and methacrylic acid were dissolved in methanol (100 cm³) and the combination was stirred for 30 minutes. The solvent was removed in vacuo to leave a clear yellow oil, 18.86 g, 100% yield.

IR $\nu_{max}$ (thin film) 3400–3200, 2976, 2800, 2420, 1706, 1551, 1456, 1405, 1234, 999, 929, 828 cm$^{-1}$.

Polymerisation of this mixture, using ultraviolet radiation in the presence of Irgacure™ 184, resulted in a copolymer having good adhesive properties.

Example 18

Preparation of a mixture of triallylamine and CF₃-substituted acrylate monomers, suitable for use as an adhesive.

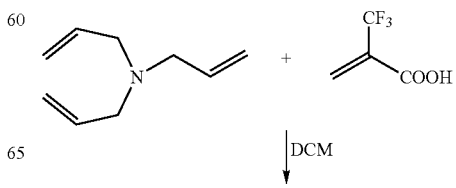

-continued

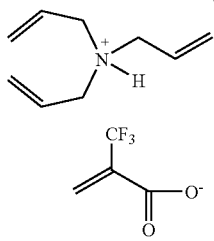

| Triallylamine | 2.44 g (0.0178 mol) |
|---|---|
| 2-(trifluoromethyl) acrylic acid | 2.50 g (0.0178 mol) |
| Dichloromethane | 25 cm³ |

Triallylamine and 2-(trifluoromethyl) acrylic acid were placed in dichloromethane to form a clear, colourless solution. The solution was filtered (Whatman No. 1 filter paper) and the solvent was removed in vacuo to leave a clear, colourless oil, 4.90 g, 99% yield.

IR $\nu_{max}$ (thin film): 2996(s), 2531(1br), 1753(s), 1646, 1456, 1154, 998 cm$^{-1}$.

$^1$H nmr (CDCl$_3$) δ: 3.55 (m, 6H), 5.40 (m, 8H), 6.05(m, 3H), 8.20 (v, br, 1H).

Polymerisation of this mixture, using ultraviolet radiation in the presence of Irgacure™ 184, resulted in a copolymer having good adhesive properties.

Example 19

Preparation of a mixture of triallylamine and vinyl phosphonate monomers, suitable for use as an adhesive.

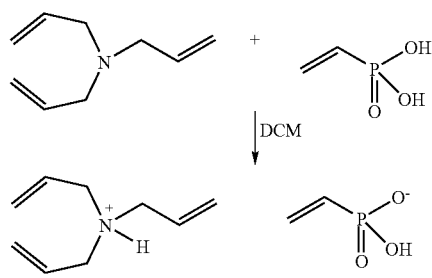

| Triallylamine | 5.0 g (0.0364 mol) |
|---|---|
| Vinyl phosphonic acid | 3.94 g (0.0364 mol) |
| Dichloromethane | 25 cm³ |

Triallylamine and vinyl phosphonic acid were placed in dichloromethane to form a clear colourless solution. The solution was filtered (Whatman No. 1 filter paper) and the solvent was removed in vacuo to leave a clear, colourless oil, 8.85 g, 99% yield.

IR $\nu_{max}$ (clear oil): 3600–3200, 3000, 2334(br), 1650, 1464(s), 1233(s), 951, 726 cm$^{-1}$.

$^1$H nmr (CDCl$_3$) δ: 3.55 (d, 6H), 5.45 (m, 6H), 5.75 (m, 1H), 6.00 (m, 3H), 6.20 (m, 2H), 12.40 (s, br, 2H).

Polymerisation of this mixture, using ultraviolet radiation in the presence of Irgacure™ 184, resulted in a copolymer having good adhesive properties.

Example 20

Preparation of a mixture of triallylamine and vinyl sulphonic acid monomers, suitable for use as an adhesive.

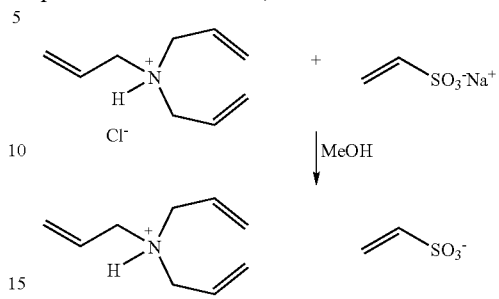

| Triallylamine hydrochloride | 10.0 g (0.058 mol) |
|---|---|
| Vinyl sulphonic acid sodium salt (25 wt % soln in H$_2$O) | 7.8 g (0.060 mol) |
| Methanol | 50 cm³ |

Triallylamine hydrochloride was dissolved in methanol. Vinyl sulphonic acid sodium salt in H$_2$O was added and the combination was stirred for 30 minutes. The solvents were removed in vacuo and the residue was placed in dichloromethane (100 cm³) and stirred for 30 minutes. Solids were removed by filtration (Whatman No. 1 filter paper). The filtrate was dried over magnesium sulphate and filtered again (Whatman No. 1 filter paper). Removal of solvent in vacuo gave a yellow oil, 13.35 g, 94% yield.

IR $\nu_{max}$ (thin film): 3600–3200, 2995, 2330(br), 1650, 1465, 1215, 1169(s), 1040, 920 cm$^{-1}$.

$^1$H nmr (CDCl$_3$) δ: 3.54 (d, 6H), 5.40 (m, 6H), 590 (m. 1H), 6.00 (m, 3H), 6.15 (m, 2H), 8.10 (s, br, 1H).

Polymerisation of this mixture, using ultraviolet radiation in the presence of Irgacure™ 184, resulted in a copolymer having good adhesive properties.

Example 21

Preparation of the di-itaconic acid monomer used in Examples 5 and 6, from itaconic anhydride and a diol.

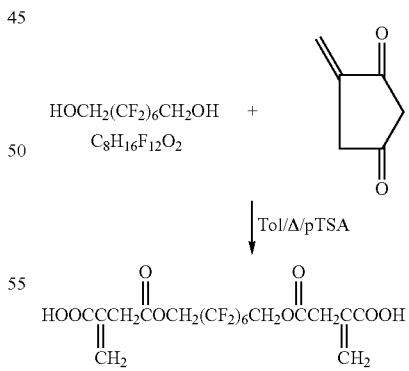

| Itaconic anhydride | 15.50 g (0.138 mol) |
|---|---|
| 2,2,3,3,4,4,5,5,6,6,7,7-dodecafluoro-1,8-octanediol | 25.0 g (0.069 mol) |

Itaconic anhydride and dodecafluoro-1,8-octanediol were placed in toluene (150 cm³). p-toluene-sulphonic acid (1 g) was added and the mixture was heated to reflux and maintained at this temperature for 6 hours when a clear solution was achieved. The reaction mixture was poured into 40/60 petrol (300 cm³) and stirred for 1 hour then left to stand for 15 hours. The precipitate formed during this period was removed by filtration (No. 1 sinter) and allowed to stand for 2 days to allow solvents to evaporate off. Yield 37.30 g, 92%, white powder.

IR $v_{max}$ (KBr disc) 3600–2400, 1758(s), 1695(s), 1405, 1325, 1139, 1020, 978, 692, 649, 551 cm$^{-1}$.

$^1$H nmr (DMSO) δ: 3.15 (s, 4H), 4.80 (t, 4H), 5.80 (s, 2H), 6.20 (s, 2H), 12.30 (s, br, 2H).

Example 22

Preparation of the substituted diallylamine monomer used in Example 13.

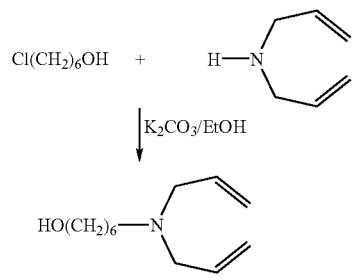

| 6-chlorohexan-1-ol | 50.0 g (0.366 mol) |
| Diallylamine | 35.56 g (0.366 mol) |
| Potassium carbonate | 55.29 g (0.40 mol) |

6-chlorohexan-1-ol, diallylamine and potassium carbonate were placed in ethanol (350 cm³) and the mixture was refluxed for 18 hours with stirring. Solids were removed by filtration (Whatman No. 1 filter paper) and the solvent was removed in vacuo to leave a yellow oil. Column chromatography (silica gel/EtOAc) followed by removal of solvent in vacuo gave 61.2 g, 88% yield, of pale yellow oil.

IR $v_{max}$ (thin film) 3369(s), 2964, 2934, 1517, 1459, 1375, 1300, 1243, 1106, 1047, 1018, 826, 770, 569 cm$^{-1}$.

$^1$H nmr (CDCl$_3$) δ: 1.49 (m, 2H), 1.50 (quin, 2H), 1.55 (quin, 2H), 2.45 (t, 2H), 2.65 (s, 1H), 3.10 (d, 4H), 3.55 (t, 2H), 3.65 (quar, 2H), 5.10 (m, 4H), 5.80 (m, 2H).

Example 23

Preparation of the di-itaconic acid monomer used in Examples 2 and 3, from itaconic anhydride and a diol.

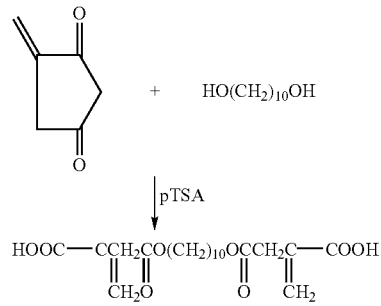

| Itaconic anhydride (112.09) | 25.75 g (0.230 mol) |
| 1,10-decanediol (174.28) | 20.0 g (0.115 mol) |
| p-toluene sulphonic acid (pTSA) | 1.0 g |
| Toluene | 100 cm³ |

Itaconic anhydride, 1,10-decanediol and p-toluene sulphonic acid were placed in toluene but did not dissolve completely. The mixture was heated to reflux with stirring and maintained at this temperature for 4 hours. The resultant colourless, clear solution was allowed to cool during which a white precipitate was formed. Petrol (40/60, 100 cm³) was added to the mixture and stirred for 15 minutes. The white precipitate was removed by filtration (No. 1 sinter) and was washed with a further quantity of petrol (40/60, 100 cm³) then dried in air to leave 41.75 g, 91% yield, of white powder.

IR $v_{max}$ (KBr disc) 3600–3100, 2926, 2856, 1739(s), 1700(s), 1639(s), 1405, 1322, 1192, 988, 924, 827, 764, 554 cm$^{-1}$.

$^1$H nmr (CDCl$_3$) δ: 1.25 (s, br, 12H), 1.69 (quin, 4H), 3.25 (s, 4H), 4.05 (t, 4H), 5.65 (s, 2H), 6.30 (s, 2H), 10.70 (s, br, 2H).

Example 24

Preparation of the bis-diallylamine monomer used in Examples 1, 2, 4 and 7–10, starting from diallylamine.

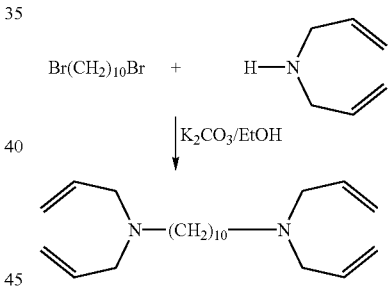

| 1,10-dibromodecane | 100.00 g (0.33 mol) |
| Diallylamine | 64.13 g (0.66 mol) |
| Potassium carbonate | 91.22 g (0.66 mol) |

Diallylamine, 1,10-dibromodecane and potassium carbonate were placed in ethanol (600 cm³) and the mixture was refluxed with stirring for 18 hours. Solids were removed by filtration and the solvent removed in vacuo to leave a yellow oil. Column chromatography (silica gel/ethyl acetate) followed by removal of solvent in vacuo gave 98.0 g, 88% yield; of pale yellow oil.

IR $v_{max}$ (thin film) 2920, 2880, 2800, 1640, 1460, 1440, 1350, 1250, 1150, 1110, 990, 915 cm$^{-1}$.

$^1$H nmr (CDCl$_3$) δ: 1.15–1.30 (m, 12H), 1.35–1.45 (m, 4H), 2.42 (t, 4H), 3.11 (d, 8H), 5.05–5.20(m, 8H), 5.30–5.57 (m, 4H).

Example 25

Preparation of a mixture of diallylamine and acrylic acid monomers, in non-stoichiometrically equivalent amounts, for use as an adhesive.

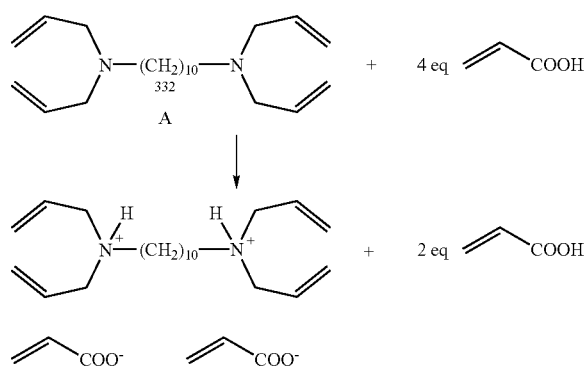

| Monomer A | 5.0 g (0.0150 mol) |
| Acrylic acid (72.06) | 4.32 g (0.06 mol) |
| Dichloromethane | 25 cm³ |

Monomer A and acrylic acid were placed in dry dichloromethane to form a clear, colourless solution. The solution was filtered (Whatman No. 1 filter paper) and the solvent was removed in vacuo to leave a clear, colourless oil. Yield 9.25 g.

IR $\nu_{max}$ (thin film) 3600–3200(s), 2862(s), 1728(s), 1641(m), 1412(s), 1195, 1057, 994 cm$^{-1}$.

These IR data confirm the presence of excess, unbound, acrylic acid in the monomer mixture.

Polymerisation of this mixture, using ultraviolet radiation in the presence of Irgacure™ 184, resulted in a copolymer having good adhesive properties.

Example 26

Preparation of a mixture of diallylamine and itaconic acid monomers, in non-stoichiometrically equivalent amounts, for use as an adhesive.

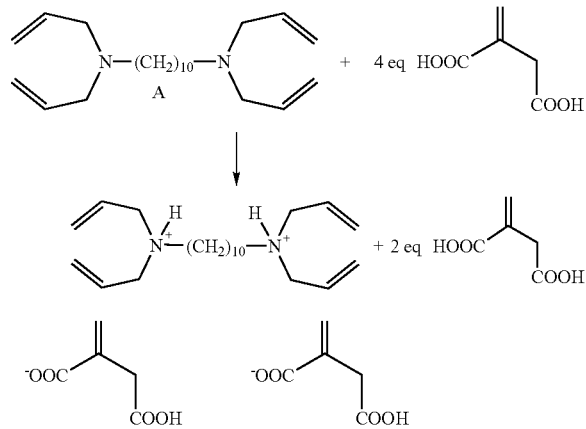

| Monomer A | 5.0 g (0.0150 mol) |
| Itaconic acid (130.10) | 7.81 g (0.060 mol) |
| Dichloromethane | 25 cm³ |
| Tetrahydrofuran | 25 cm³ |

Monomer A and itaconic acid were placed in dichloromethane-tetrahydrofuran (1:1) and the mixture was warmed to form, after 5 minutes, a clear solution. The solution was filtered (Whatman No. 1 filter paper) and the solvents removed in vacuo to leave a clear, colourless, heavy oil. Yield 12.68 g.

IR $\nu_{max}$ (thin film) 3400–3100(s), 2936(s), 2800–2400(s), 1774(m), 1720(s), 1580(s), 1468, 1313, 1200, 997, 951, 815 cm$^{-1}$. Again, the IR data confirm the presence of excess acid in the monomer mixture.

Polymerisation of this mixture, using ultraviolet radiation in the presence of Irgacure™ 184, resulted in a copolymer having good adhesive properties.

Example 27

Preparation of a mixture of triallylamine and acrylic acid monomers, in non-stoichiometrically equivalent amounts, for use as an adhesive.

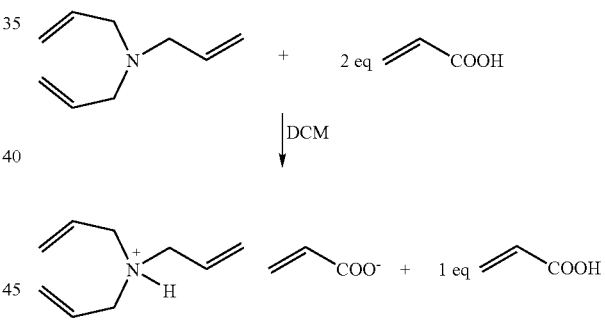

| Triallylamine (137.23) | 5.0 g (0.036 mol) |
| Acrylic acid (72.06) | 5.19 g (0.072 mol) |
| Dichloromethane | 25 cm³ |

Triallylamine and acrylic acid were dissolved in dichloromethane and the resultant solution was filtered (Whatman No. 1 filter paper). Removal of solvent in vacuo gave a clear, colourless oil. Yield 10.0 g.

IR $\nu_{max}$ (thin film) 3500–3100(s), 2975(s), 2800–2400(s), 1729(s), 1580(m), 1412, 1192, 1200(s), 1060, 992 cm$^{-1}$. The IR data confirm the presence of excess acid in the monomer mixture.

Polymerisation of this mixture, using ultraviolet radiation in the presence of Irgacure™ 184, resulted in a copolymer having good adhesive properties.

Example 28

Preparation of an adhesive from a mixture of diallylamine and vinyl sulphonic acid monomers, in non-stoichiometrically equivalent amounts.

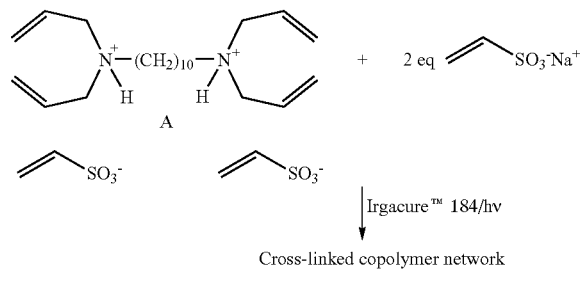

| Monomer A/vinyl sulphonic acid sodium salt combination | 0.5 g |
|---|---|
| Irgacure ™ 184 (Ciba-Geigy) (5% w/w) | 25 mg |

The initial mixture contained stoichiometrically equivalent amounts of Monomer A and vinyl sulphonic acid sodium salt, together with Irgacure™ 184 and two further equivalents of the acid salt. These were warmed together with mixing to ensure complete dissolution and the solution was spread on a glass plate to cover an area of 10×5 cm. The monomer mixture/photoinitiator film was irradiated with a Philips UVA (75 W) sunlamp for 30 minutes. The resultant polymer film was removed as flexible sheets of clear material (scalpel).

IR $\nu_{max}$ (KBr disc) 3600–3200(s), 2937(s), 2800–2400 (broad, s), 1678(m), 1465(s), 1210(s), 1160(s), 1037, 720 cm$^{-1}$.

Example 29

Copolymerisation of diallylamine and vinyl phosphonic acid monomers, in non-stoichiometrically equivalent amounts, to produce a hard coating.

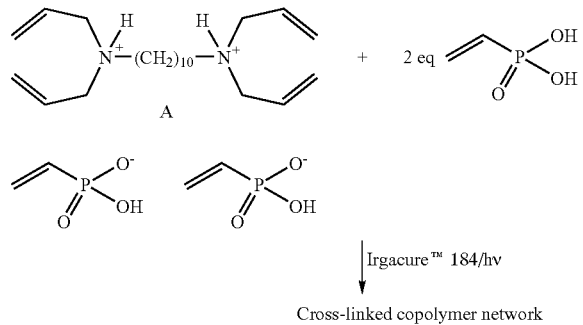

| Monomer A/vinyl phosphonic acid combination | 0.5 g |
|---|---|
| Irgacure ™ 184 (Ciba-Geigy) (5% w/w) | 25 mg |

The initial mixture contained stoichiometrically equivalent amounts of Monomer A and vinyl phosphonic acid, together with Irgacure™ 184 and two further equivalents of the acid. These were polymerised as in Example 28. The resultant polymer was removed as hard, brittle fragments (scalpel).

IR $\nu_{max}$ (KBr disc) 3600–3200(broad, s), 2860(s), 2840(s), 2800–2400(broad, s), 1677(m), 1463(w), 1240–840 (broad, s), 718 cm$^{-1}$.

Example 30

Copolymerisation of diallylamine and acrylate monomers, in non-stoichiometrically equivalent amounts, to produce a hard coating.

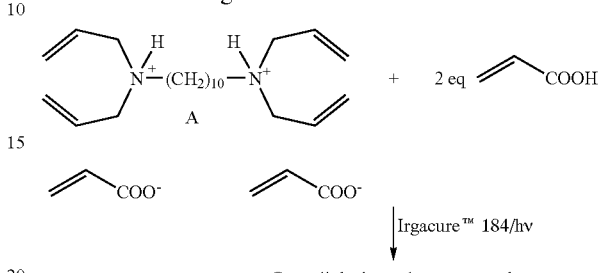

| Monomer A/acrylic acid combination | 0.5 g |
|---|---|
| Irgacure ™ 184 (Ciba-Geigy) (5% w/w) | 25 mg |

The initial mixture contained stoichiometrically equivalent amounts of Monomer A and acrylic acid, together with Irgacure™ 184 and two further equivalents of the acid. These were polymerised as in Example 28 and the resultant polymer was removed as hard, brittle fragments (scalpel).

IR $\nu_{max}$ (KBr disc) 3650–3180(broad, s), 2938(s), 2800–2350(broad, s), 1723(m), 1575(m), 1454(m), 1246 (m), 1000(w) cm$^{-1}$.

Example 31

Copolymerisation of diallylamine and itaconate monomers, in non-stoichiometrically equivalent amounts, to produce a hard coating.

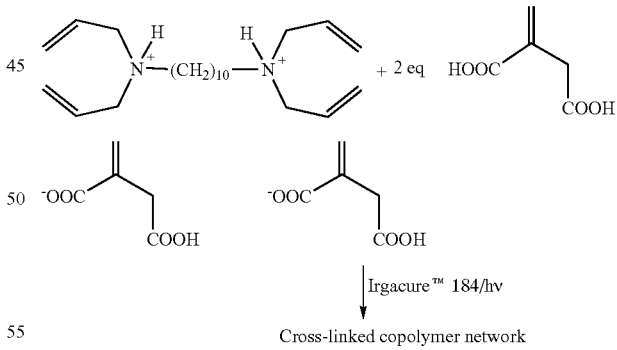

| Monomer A/itaconic acid combination | 0.5 g |
|---|---|
| Irgacure ™ 184 (Ciba-Geigy) (5% w/w) | 25 mg |

The initial mixture contained stoichiometrically equivalent amounts of Monomer A and itaconic acid, together with Irgacure™ 184 and two further equivalents of the acid. The mixture was polymerised as in Example 28. The resultant polymer was removed as hard, brittle fragments (scalpel).

IR $\nu_{max}$ (KBr disc) 3650–3200(broad, s), 2880(s), 2800–2400(broad, s), 1730(s), 1580(m), 1460(m), 1210(s), 1000(w), 750 cm$^{-1}$.

Example 32

Preparation of a mixture of diallylamine and vinyl sulphonic acid monomers, in non-stoichiometrically equivalent amounts, for use as an adhesive.

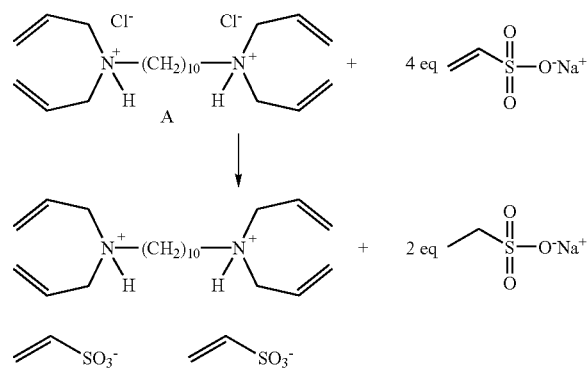

| Monomer A | 5.0 g (0.0124 mol) |
| Vinyl sulphonic acid sodium salt | 6.50 g (0.050 mol) |
| (25 wt % solution in H$_2$O) | = 30 cm$^3$ solution |

Vinyl sulphonic acid sodium salt in H$_2$O was added to a solution of Monomer A in methanol (50 cm$^3$) and the combination was stirred for 30 minutes. Solvents were removed in vacuo and the residue was placed in dichloromethane and stirred for 30 minutes.

Insoluble materials were removed by filtration (Whatman No. 1 filter paper) and the filtrate was dried over magnesium sulphate. Removal of solvent in vacuo gave a heavy, colourless oil, 11.38 g.

IR $\nu_{max}$ (thin film) 3650–3250(s), 2935(s), 2640–2200(s), 1700(w), 1649(w), 1468(s), 1387(w), 1229(s), 1167(s), 1039(s), 946, 746 cm$^{-1}$.

Example 33

Preparation of a mixture of diallylamine and vinyl phosphonic acid monomers, in non-stoichiometrically equivalent amounts, for use as an adhesive.

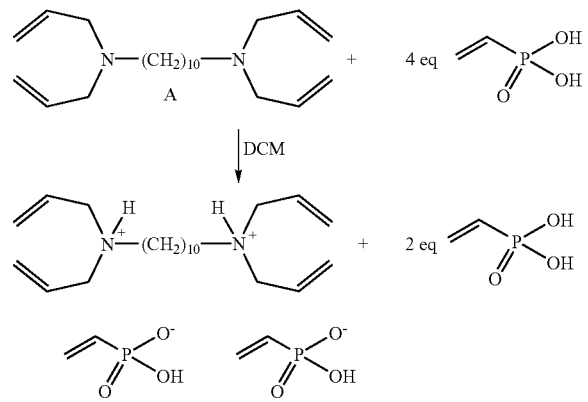

| Monomer A | 5.0 g (0.0151 mol) |
| Vinyl phosphonic acid | 6.52 g (0.0602 mol) |
| Dichloromethane | 25 cm$^3$ |

Monomer A and vinyl phosphonic acid were placed in dry dichloromethane to form a clear colourless solution. The solution was filtered (Whatman No. 1 filter paper) and the solvent was removed in vacuo to leave a clear, colourless oil, 11.42 g.

IR $\nu_{max}$ (thin film) 3600–3200(s), 2800–2500(s), 1470 (w), 1200–950(broad, strong), 726 cm$^{-1}$.

Example 34

Preparation of an adhesive composition from a mixture of bis-diallylamine and acrylic acid monomers, in non-stoichiometrically equivalent amounts.

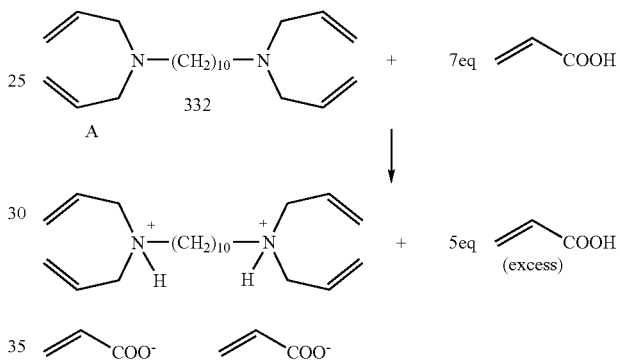

| Monomer A | 2.0 g (0.0060 mol) |
| Acrylic acid (72.06) | 3.03 g (0.042 mol) |
| Dichloromethane | 25 cm$^3$ |

Monomer A and acrylic acid were placed in dry dichloromethane to form a clear, colourless solution. The solution was filtered (Whatman No. 1 filter paper) and the solvent removed in vacuo to leave a clear, colourless oil. Yield 5.0 g.

IR $\nu_{max}$ (thin film) 3600–3200(s), 2938, 2860(s), 2700–2400(s), 1729(v,s), 1640, 1424, 1215, 1041, 991 cm$^{-1}$.

0.5 g of the Monomer A/acrylic acid mixture was then warmed with 25 mg Irgacure™ 184 (Ciba-Geigy, 5% w/w), with mixing to ensure homogeneity. The resultant solution was spread on a glass plate to cover an area of 10×5 cm. The monomer/photoinitiator film was irradiated with a Philips UVA sunlamp (75 W) for 30 minutes. The resultant crosslinked polymer was removed as brittle fragments (scalpel). IR $\nu_{max}$ (KBr disc) 3600–3150(v,s), 2940, 1727(v,s), 1562, 1455, 1174 cm$^{-1}$.

Example 35

Example 34 was repeated, but using 12 molar equivalents of the acrylic acid, yielding a monomer mixture containing 10 molar equivalents of excess acid. The mixture was then UV irradiated to form a cross-linked polymer network.

|  |  |
|---|---|
| Monomer A | 2.0 g (0.0060 mol) |
| Acrylic acid | 5.19 g (0.072 mol) |
| Dichloromethane | 25 cm$^3$ |
| Yield | 6.95 g. |

IR $\nu_{max}$ (thin film) 3600–3000(v,s), 2940, 2700–2400(s), 1708(v,s), 1639, 1432, 1299, 1244, 1043, 988 cm$^{-1}$.

0.5 g of this monomer A/acrylic acid mixture was treated with Irgacure™ 184 and UVA radiation, under the same conditions as in Example 34. Again, the polymer was removed as brittle fragments (scalpel).

IR $\nu_{max}$ (KBr disc) 3700–3000(v,s), 2941, 1730 v,s), 1455, 1244, 806 cm$^{-1}$.

Example 36

Preparation of an adhesive composition from a mixture of bis-diallylamine and vinyl sulphonic acid monomers, in non-stoichiometrically equivalent amounts.

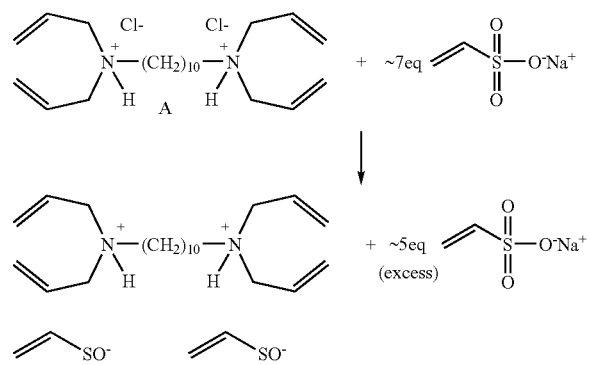

|  |  |
|---|---|
| Monomer A | 5.0 g (0.0124 mol) |
| Vinyl sulphonic acid sodium salt | 11.30 g |
| (25 wt % solution in water) | ($\equiv$ 52.5 cm$^3$ solution) |

Vinyl sulphonic acid sodium salt in water was added to a solution of Monomer A in methanol (50 cm$^3$) and the combination was stirred for 30 minutes. Solvents were removed in vacuo and the residue was placed in dichloromethane and the mixture stirred for 30 minutes. Insoluble materials were removed by filtration (Whatman No 1 filter paper) and the filtrate was dried over magnesium sulphate. Removal of solvent in vacuo gave a colourless oil. Yield 15.8 g.

IR $\nu_{max}$ (thin film) 3650–3250(s), 2935(s), 2800–2200 (v,s), 1700(w), 1467(s), 1387(w), 1229(v,s), 1168(v,s), 1039(s), 945, 743, 663 cm$^{-1}$.

0.5 g of this Monomer A/vinyl sulphonic acid sodium salt combination was then treated with Irgacure™ 184 and UVA radiation, under the same conditions as in Example 34. The resultant cross-linked polymer film was removed as brittle fragments (scalpel).

IR $\nu_{max}$ (KBr disc) 3600–3000(v,s), 2938(s), 2800–2200 (broad,s), 1678(m), 1407, 996, 732 cm$^{-1}$.

Example 37

Preparation of an adhesive composition from a mixture of bis-diallylamine and vinyl phosphonic acid monomers, in non-stoichiometrically equivalent amounts.

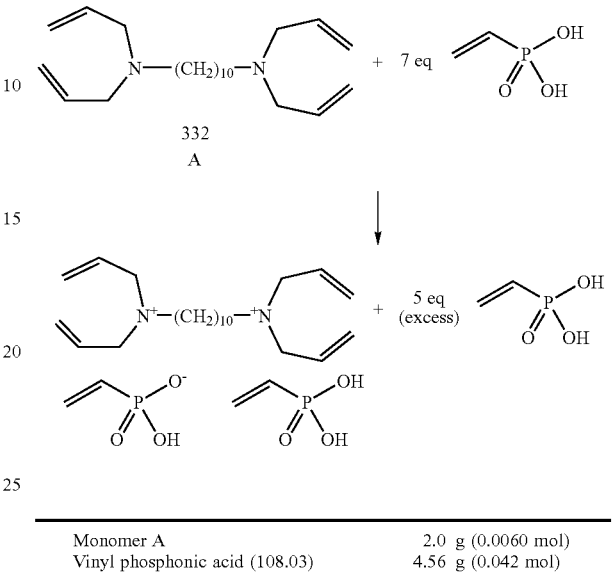

|  |  |
|---|---|
| Monomer A | 2.0 g (0.0060 mol) |
| Vinyl phosphonic acid (108.03) | 4.56 g (0.042 mol) |

Monomer A and vinyl phosphonic acid were placed in dry dichloromethane to form a clear colourless solution. The solution was filtered (Whatman No. 1 filter paper) and the solvent removed in vacuo to leave a clear, colourless oil, 6.50 g.

IR $\nu_{max}$ (thin film) 3600–3100, 2937, 2450–2200, 1618, 1407(w), 1120, 990, 732 cm$^{-1}$.

0.5 g of this Monomer A/vinyl phosphonate combination was treated with Irgacure™ 184 and UVA radiation, under the same conditions as in Example 34. The resultant cross-linked polymer film was removed as brittle fragments (scalpel).

IR $\nu_{max}$ (KBr disc) 3600–3100(v, br), 2940–2860(v, br), 1620(br), 1410(br), 1120 cm$^{-1}$.

Example 38

Use of the composition prepared in Example 37 as a glass adhesive. Two drops of the Monomer A/vinyl phosphonate mixture prepared in Example 37 were placed, with Irgacure™ 184 (Ciba-Geigy) (5% w/w), between two 7.5×2.5 cm glass microscope slides arranged crossways and overlapping in their central regions. The slides were pressed together to form a thin film of adhesive/photoinitiator between them.

The film was then irradiated with a Philips UVA (75 W) sunlamp for around 15 minutes to form a strong adhesive bond between the slides.

A further two drops of the adhesive/photoinitiator mixture were placed on adjacent 7.5 cm edges of two 7.5×2.5 cm glass slides, and the slides were squeezed together along those edges. They were then exposed to the Philips UVA (75 W) sunlamp for 10–15 minutes, following which a strong adhesive bond had formed between them.

What is claimed is:

1. copolymer containing repeat units formed from both the monomer (I):

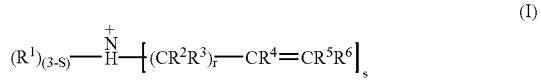

wherein each $R^1$, if present, is independently either hydrogen or a hydrocarbyl group; r is 0, 1 or 2; s is either 2 or 3; $R^{2-R4}$ are each independently hydrogen or a hydrocarbyl group; and $R^5$ and $R^6$ are each independently either hydrocarbyl, halo or hydrogen;

and the monomer (II):

wherein $P_d^{31}$ is the anion formed by loss of a proton from a proton donating group $P_d$—H; Z is either a bond or a hydrocarbyl group; $R^7$ and $R^8$ are each independently hydrogen, a halo group or a hydrocarbyl group; and either (a) A is an electron accepting group, in which case. W is either hydrogen or a hydrocarbyl group, (b) W is an electron accepting group and A is either a bond or a hydrocarbyl group or (c) both A and W are electron accepting groups;

wherein either:

(a) the monomer (II) has the general formula (IX):

in which $B^1$ is a bridging group of valency v, v is an integer from 2 to 8 and the groups —$P_d$H may be wholly or partially present as the deprotonated analogues —$P_d^{31}$ ; or (b) the monomer (I) has the formula (X):

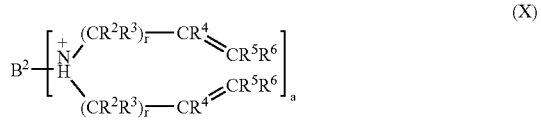

in which $B^2$ is a bridging group of valency a, and a is an integer from 2–8, or (c) both monomer (I) and (II) are selected from (IX) and (X) respectively, with the proviso that $B^2$ is not a phenyl or a substituted phenyl group or an alkylene group containing 2–8 carbon atoms.

2. A copolymer according to claim 1, wherein in the monomer (II) the proton donating group $P_d$—H is OH.

3. A copolymer according to claim 1 wherein in the monomer (II) an electron accepting group A or W is, or contains, C=O, O=S=O or P=O.

4. A copolymer according to claim 1 wherein in the monomer (II) Z is a bond.

5. A copolymer according to claim 1, wherein in the monomer (II) $R^7$ and $R^8$ are both hydrogen.

6. A copolymer according to claim 1, wherein the monomer (II) is an optionally substituted acrylate, methacrylate, itaconate, vinyl sulphonate or vinyl phosphonate.

7. A copolymer according to claim 1, wherein the copolymer is formed from said monomer (II) of said formula (IX).

8. A copolymer according to claim 7, wherein v is 2.

9. A copolymer according to claim 8, wherein $B^1$ is $H_2C$—C(O)—O—$(CH_2)_w$—O—C(O)—$CH_2$, where w is an integer from 1 to 20, or $H_2C$—C(O)—O—$CH_2$—$(CF_2)_y$—$CH_2$—O—C(O)—$CH_2$, where y is an integer from 1 to 10.

10. A copolymer according to claim 1, wherein in the monomer (I) r is 1.

11. A copolymer according to claim 1, wherein in the monomer (I), $R^2$–$R^6$ are all hydrogen.

12. A copolymer according to claim 1, wherein in the monomer (I), $R^1$ is either hydrogen or hydroxyalkyl.

13. A copolymer according to claim 1, wherein in the monomer (I), s is 2.

14. A copolymer according to claim 13, wherein in the monomer (I), $R^1$ is hydrogen.

15. A copolymer according to claim 13, wherein in the monomer (I), $R^1$ is not hydrogen.

16. A copolymer according to claim 1, wherein in the monomer (I), s is 3.

17. A copolymer according to claim 1, wherein the copolymer is formed from said monomer (I) of said formula (X).

18. A copolymer according to claim 17, wherein a is 2.

19. A copolymer according to claim 18, wherein $B^2$ is —$(CH2)_b$ where b is an integer from 1 to 20.

20. A copolymer according to claim 1, containing stoichiometrically equivalent amounts of the monomers (I) and (II).

21. A copolymer according to claim 1, containing a stoichiometric excess of the monomer (II).

22. A copolymer according to claim 1, containing at least 40% w/w of the monomer (I).

23. A copolymer according to claim 1, containing at least 40% w/w of the monomer (II).

24. A copolymer according to claim 1, which is water impermeable or substantially so.

25. A method for preparing a copolymer according to claim 1, the method comprising polymerising a mixture of the monomers (I) and (II).

26. A method according to claim 25, wherein the monomer mixture is prepared by mixing together the precursor allylamine (III):

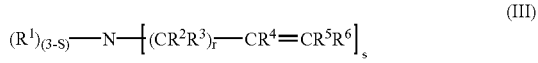

and the proton donor (IV):

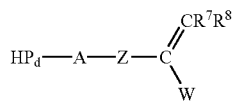 (IV)

wherein $R^1$–$R^8$, r, s, —$P_d$H, Z, A and W are as defined in any one of claims 1 to 25.

27. A method according to claim 25, wherein the monomer mixture is prepared by mixing together the already ionised monomers (I) and (II), each stabilised by a suitable counterion.

28. A method according to claim 25, wherein the monomer mixture is polymerised by exposure to ultraviolet radiation.

* * * * *